US009203822B2

(12) United States Patent
Ono et al.

(10) Patent No.: US 9,203,822 B2
(45) Date of Patent: Dec. 1, 2015

(54) NETWORK SYSTEM, DATA PROCESSING APPARATUS, AND METHOD FOR MULTI-FACTOR AUTHENTICATION

(71) Applicants: Yohei Ono, Kanagawa (JP); Noriko Kota, Kanagawa (JP)

(72) Inventors: Yohei Ono, Kanagawa (JP); Noriko Kota, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 123 days.

(21) Appl. No.: 14/010,651

(22) Filed: Aug. 27, 2013

(65) Prior Publication Data
US 2014/0068714 A1 Mar. 6, 2014

(30) Foreign Application Priority Data
Sep. 6, 2012 (JP) ................................. 2012-196064

(51) Int. Cl.
*H04L 29/06* (2006.01)
*G06F 3/12* (2006.01)

(52) U.S. Cl.
CPC .............. *H04L 63/08* (2013.01); *H04L 63/083* (2013.01); *G06F 3/1222* (2013.01); *G06F 3/1238* (2013.01); *G06F 3/1288* (2013.01)

(58) Field of Classification Search
None
See application file for complete search history.

(56) References Cited

U.S. PATENT DOCUMENTS

| 5,944,824 | A | * | 8/1999 | He ...................................... 726/6 |
| 6,067,621 | A | * | 5/2000 | Yu et al. .......................... 713/172 |
| 7,363,494 | B2 | * | 4/2008 | Brainard et al. ............... 713/168 |
| 8,219,802 | B2 | | 7/2012 | Doleh et al. |
| 2007/0130473 | A1 | * | 6/2007 | Mazotas ........................ 713/183 |
| 2008/0231887 | A1 | | 9/2008 | Sakagami et al. |

FOREIGN PATENT DOCUMENTS

| JP | 2008-244518 | 10/2008 |
| JP | 2010-086435 | 4/2010 |
| JP | 2011-522307 | 7/2011 |

* cited by examiner

Primary Examiner — Christopher Revak
(74) Attorney, Agent, or Firm — IPUSA, PLLC

(57) ABSTRACT

A method for processing data with a terminal and a system connected to the terminal via a network, which includes the steps of executing a process according to a request transmitted from the terminal via the network, performing a first user authentication with respect to the terminal by using the terminal or an authentication apparatus connected to the terminal via the network, storing first authentication data used for the first user authentication in association with second authentication data used for a second user authentication in a storage unit, and performing the second user authentication with respect to the system. In a case where at least a portion of the first authentication data is authenticated by the first user authentication, the second user authentication is performed by using the first and second authentication data stored in the storage unit and the portion of the first authentication data.

12 Claims, 34 Drawing Sheets

FIG.5A

| USER IDENTIFICATION DATA | PASSWORD |
|---|---|
| Koba | LLL |
| YAMA | MMM |
| Suzuki | NNN |

FIG.5B

| USER IDENTIFICATION DATA | PASSWORD | CARD IDENTIFICATION DATA |
|---|---|---|
| Koba | LLL | 123 |
| YAMA | MMM | 456 |
| Suzuki | NNN | 789 |

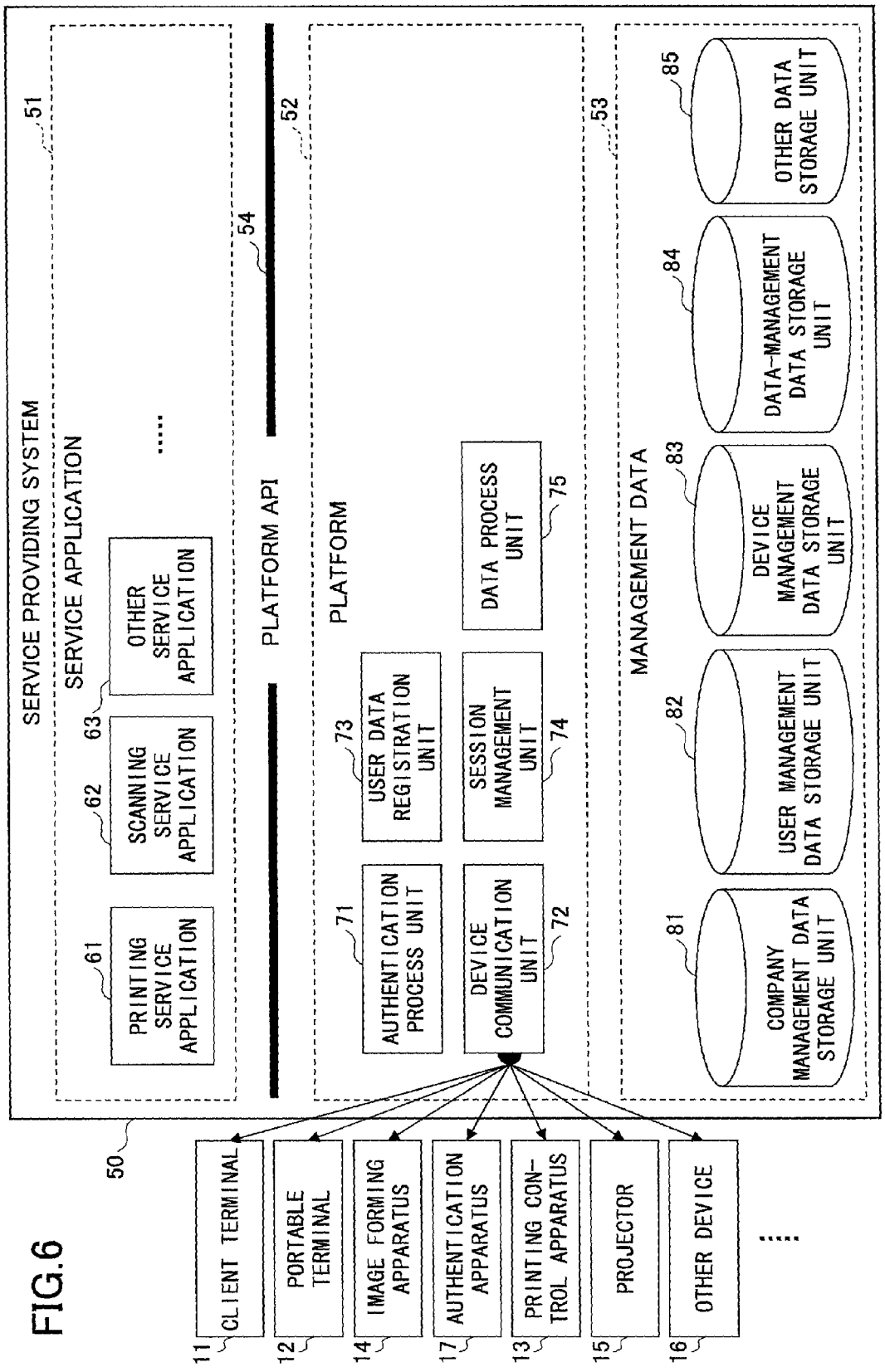

FIG.7

| COMPANY CODE | COMPANY NAME | COUNTRY | LANGUAGE | ... |
|---|---|---|---|---|
| XXX | COMPANY A | JAPAN | JAPANESE | |
| YYY | COMPANY B | U.S.A | ENGLISH | |

FIG.8A

| COMPANY CODE | USER NAME | PASSWORD | ROLE | ADDRESS INFORMATION | OUTPUT SETTING | OFFICE AUTHENTICATION DATA | ... |
|---|---|---|---|---|---|---|---|
| XXX | Kobayashi | AAA | ADMINISTRATOR | A@aaa.com | DOUBLE-SIDE/COLOR | — | |
| | Yamashita | BBB | USER | B@aaa.com | SINGLE-SIDE/COLOR | — | |
| | Suzuki | CCC | USER | C@aaa.com | DOUBLE-SIDE/MONOCHROME | Suzuki | |
| YYY | Suzuki | ABC | ADMINISTRATOR | A@bbb.com | SINGLE-SIDE/4 IN 1 | SUZUKI | |
| | Yama | DDD | USER | D@bbb.com | DOUBLE-SIDE/2 IN 1 | Yamada | |

FIG.8B

| COMPANY CODE | USER NAME | PASSWORD | ROLE | ADDRESS INFORMATION | OUTPUT SETTING | OFFICE AUTHENTICATION DATA | ... |
|---|---|---|---|---|---|---|---|
| XXX | Kobayashi | AAA | ADMINISTRATOR | A@aaa.com | DOUBLE-SIDE/COLOR | Koba | |
| | Yamashita | BBB | USER | B@aaa.com | SINGLE-SIDE/COLOR | — | |
| | Suzuki | CCC | USER | C@aaa.com | DOUBLE-SIDE/MONOCHROME | Suzuki | |
| YYY | Suzuki | ABC | ADMINISTRATOR | A@bbb.com | SINGLE-SIDE/4 IN 1 | SUZUKI | |
| | Yama | DDD | USER | D@bbb.com | DOUBLE-SIDE/2 IN 1 | Yamada | |

FIG.9

| COMPANY CODE | DEVICE AUTHENTICATION DATA | OFFICE DATA | CAPABILITY | ... |
|---|---|---|---|---|
| XXX | 111 | OFFICE A | A4 COLOR MACHINE | |
| | 222 | OFFICE B | A2 COLOR MACHINE | |
| | 333 | OFFICE B | A4 MONOCHROME MACHINE | |
| YYY | 444 | — | A4 COLOR MACHINE | |

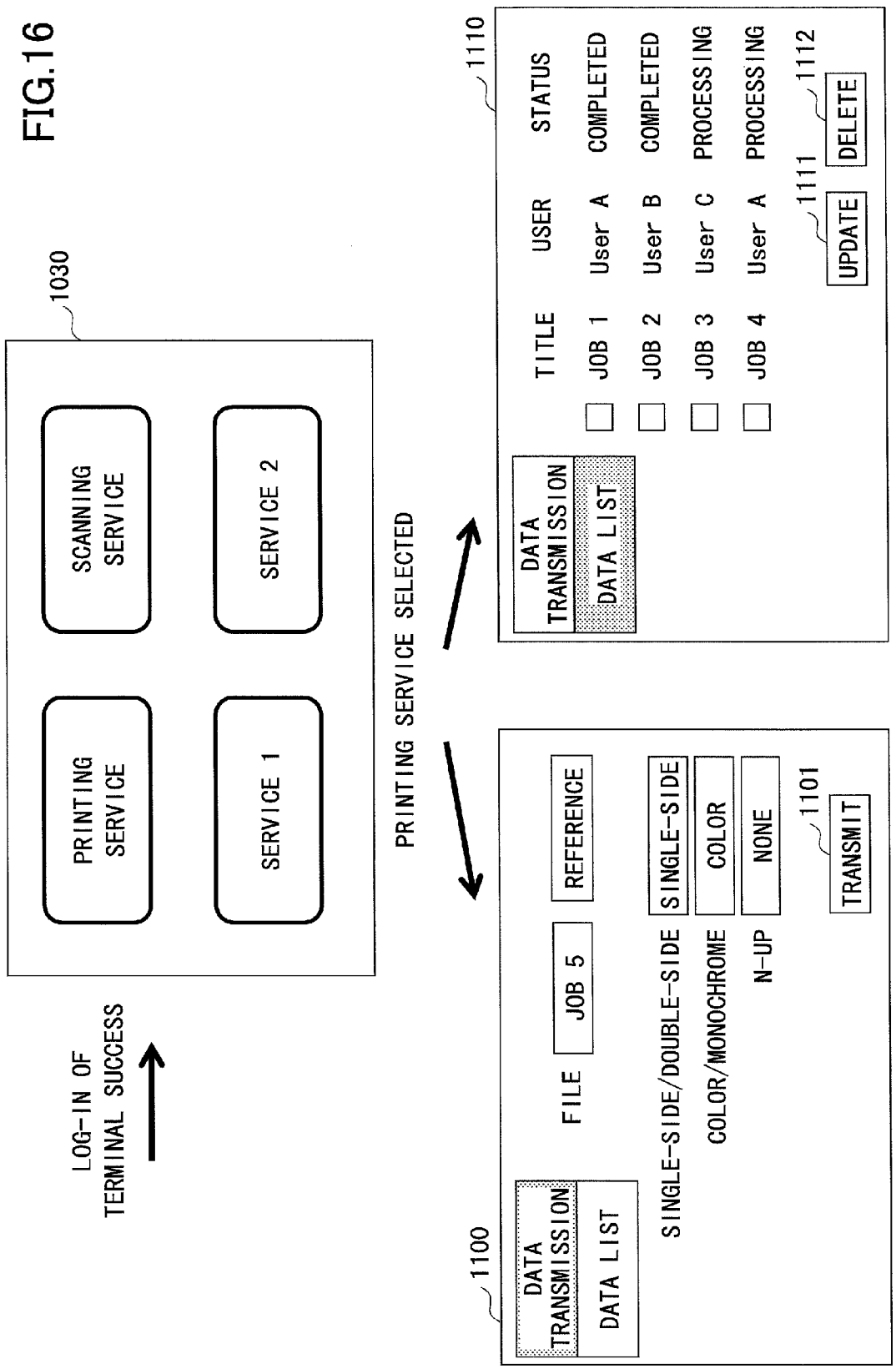

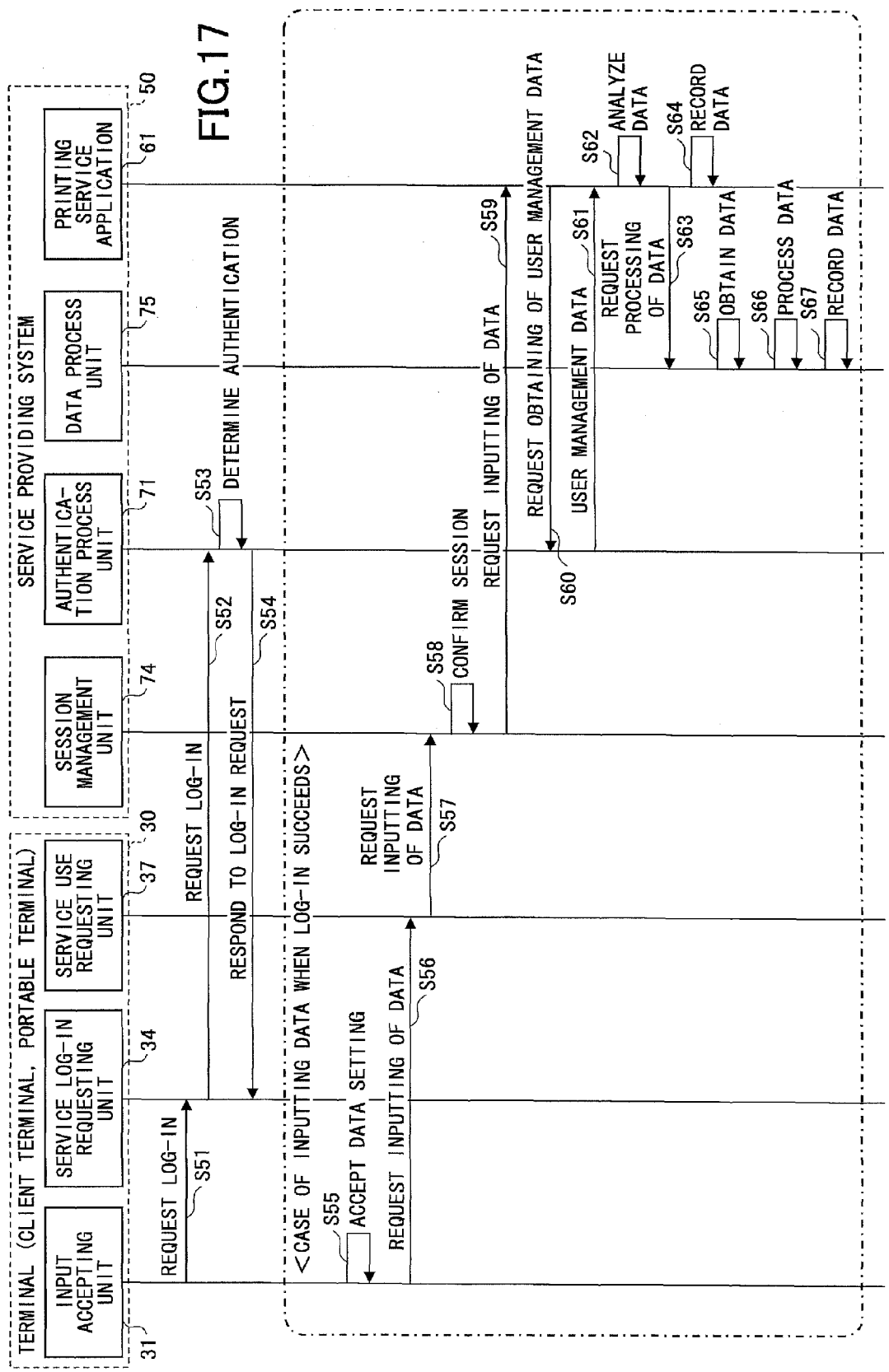

FIG.18

| JOB ID | URL OF INPUT DATA | URL OF CONVERTED DATA 1 | URL OF CONVERTED DATA 2 | ... | CONVERSION STATUS |
|---|---|---|---|---|---|
| 1 | Job1/storage | Job11/storage | Job111/storage | | COMPLETED |
| 2 | Job2/storage | Job22/storage | — | | COMPLETED |
| 3 | Job3/storage | Job33/storage | — | | PROCESSING |
| 4 | Job4/storage | Job44/storage | Job444/storage | | PROCESSING |
| 5 | Job5/storage | Job55/storage | — | | COMPLETED |

FIG.19A

| OUTPUT DATA ID | COMPANY CODE | USER IDENTIFICATION DATA | BIBLIOGRAPHIC DATA | JOB ID | CONVERSION STATUS |
|---|---|---|---|---|---|
| 1 | XXX | User A | ... | 1 | PROCESSING |
| 2 | XXX | User B | ... | 2 | PROCESSING |
| 3 | XXX | User C | ... | 3 | PROCESSING |
| 4 | XXX | User A | ... | 4 | PROCESSING |
| 5 | YYY | User D | ... | 5 | PROCESSING |

FIG.19B

| OUTPUT DATA ID | COMPANY CODE | USER IDENTIFICATION DATA | BIBLIOGRAPHIC DATA | JOB ID | CONVERSION STATUS |
|---|---|---|---|---|---|
| 1 | XXX | User A | ... | 1 | COMPLETED |
| 2 | XXX | User B | ... | 2 | COMPLETED |
| 3 | XXX | User C | ... | 3 | PROCESSING |
| 4 | XXX | User A | ... | 4 | PROCESSING |
| 5 | YYY | User D | ... | 5 | COMPLETED |

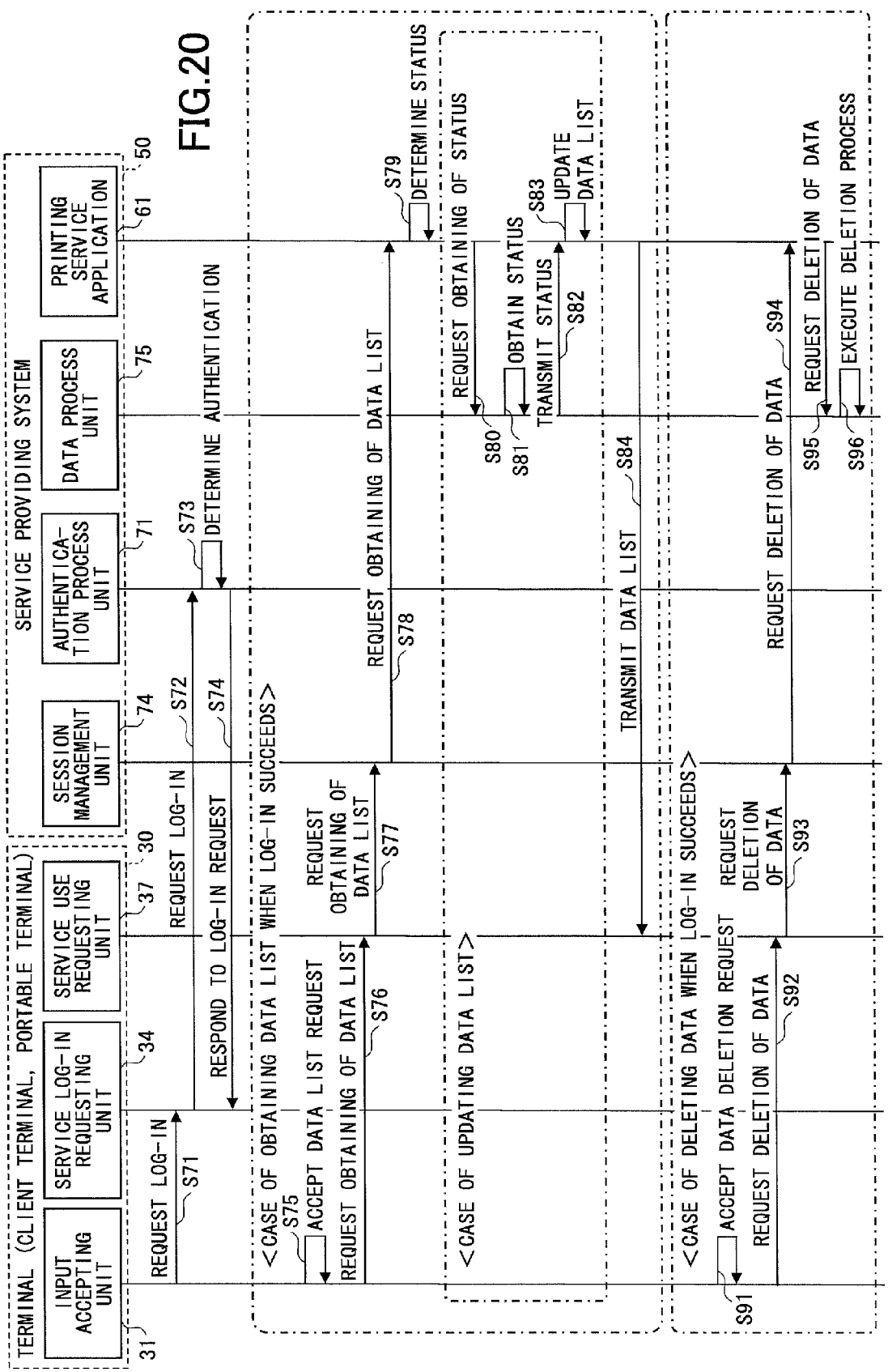

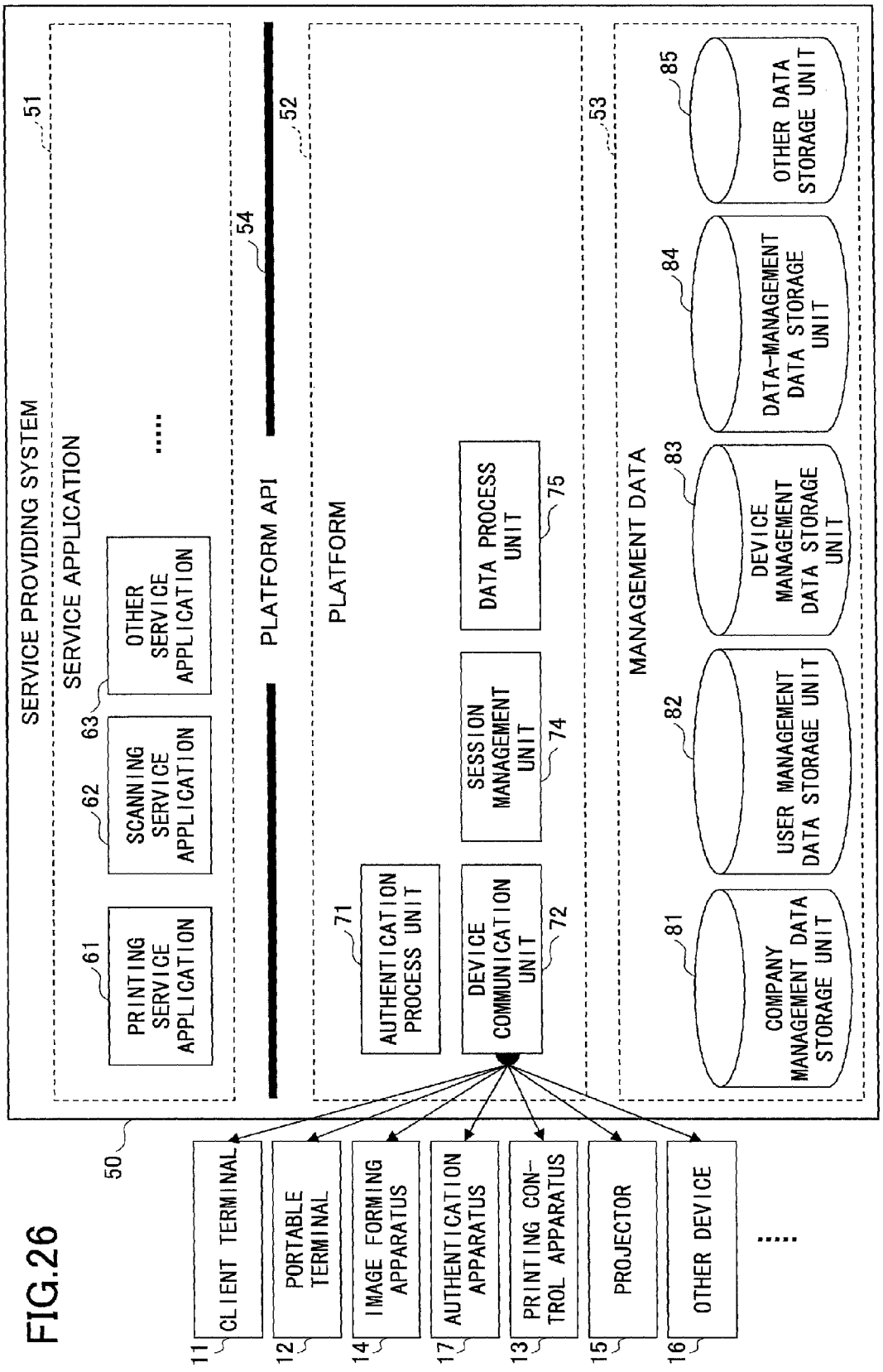

FIG.27A

| USER IDENTIFICATION DATA | PASSWORD | SERVICE USER NAME | SERVICE PASSWORD |
|---|---|---|---|
| Koba | LLL | Kobayashi | AAA |
| YAMA | MMM | – | – |
| Suzuki | NNN | Suzuki | CCC |

FIG.27B

| USER IDENTIFICATION DATA | PASSWORD | CARD IDENTIFICATION DATA | SERVICE USER NAME | SERVICE PASSWORD |
|---|---|---|---|---|
| Koba | LLL | 123 | Kobayashi | AAA |
| YAMA | MMM | 456 | – | – |
| Suzuki | NNN | 789 | Suzuki | CCC |

FIG.28

| COMPANY CODE | USER NAME | PASSWORD | ROLE | ADDRESS INFORMATION | OUTPUT SETTING | ... |
|---|---|---|---|---|---|---|
| XXX | Kobayashi | AAA | ADMINISTRATOR | A@aaa.com | DOUBLE-SIDE/COLOR | |
| | Yamashita | BBB | USER | B@aaa.com | SINGLE-SIDE/COLOR | |
| | Suzuki | CCC | USER | C@aaa.com | DOUBLE-SIDE/MONOCHROME | |
| YYY | Suzuki | ABC | ADMINISTRATOR | A@bbb.com | SINGLE-SIDE/4 IN 1 | |
| | Yama | DDD | USER | D@bbb.com | DOUBLE-SIDE/2 IN 1 | |

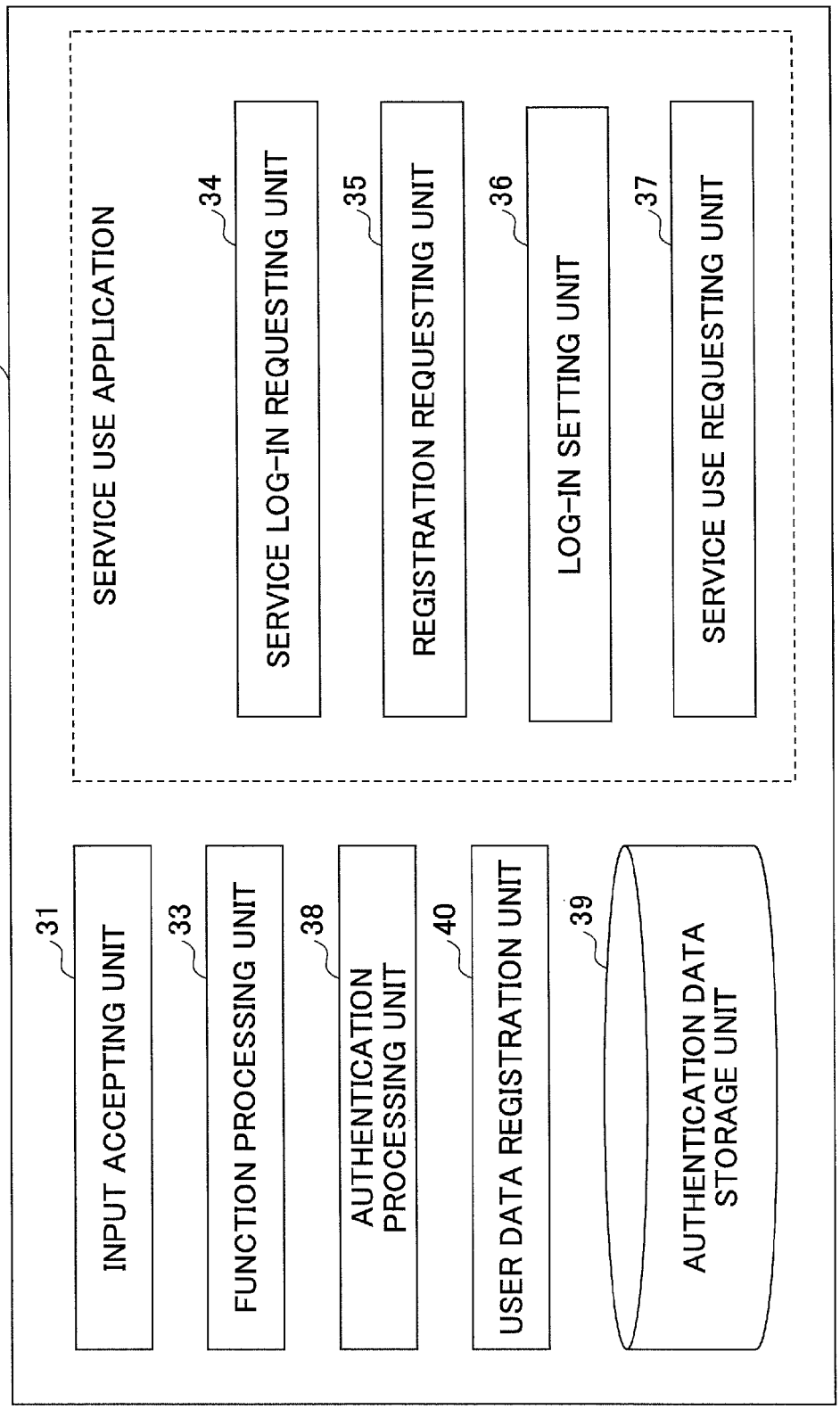

NETWORK SYSTEM, DATA PROCESSING APPARATUS, AND METHOD FOR MULTI-FACTOR AUTHENTICATION

BACKGROUND OF THE INVENTION

1. Field of the Invention

The present invention relates to a network system, a data processing apparatus, and a data processing method.

2. Description of the Related Art

Conventionally, an image forming apparatus management system including an image forming apparatus and a management server for controlling processes performed by the image forming apparatus is known (see, for example, Japanese Laid-Open Patent Publication No. 2008-244518).

With the conventional image forming apparatus management system, the image forming apparatus obtains, for example, IC card identification data from an IC card reader. After the IC card identification data is obtained from the IC card reader, the management server obtains a user ID corresponding to the IC card identification data obtained from the image forming apparatus along with use restriction data pertaining to the use of the image forming apparatus. The management server allows the image forming apparatus to perform a process based on the use restriction data.

In recent years, there is a wide spread of a kind of use (service) in which a server of a public network is used instead of a server of a private network (e.g., in-house network). One example of this kind of use (service) is a cloud service. With this kind of use, an unspecified large number of users and companies are anticipated to use the server of the public network.

Accordingly, in a case where the server of the public network is used by such unspecified large number of users and companies, user authentication is, in general, performed from the standpoint of information security. For example, user authentication is performed in the private network (e.g., in-house network) and a public network (e.g., cloud service).

From the standpoint of information security, it is not preferable to use the same authentication data for both the public network and the private network. On the other hand, using separate authentication data for the private network and the public network and inputting authentication data with respect to each function/service is not convenient for the user.

SUMMARY OF THE INVENTION

The present invention may provide a network system, a data processing apparatus, and a data processing method that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a network system, a data processing apparatus, and a data processing method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a method for processing data with a terminal and a system connected to the terminal via a network, which includes the steps of executing a process according to a request transmitted from the terminal via the network, performing a first user authentication with respect to the terminal by using the terminal or an authentication apparatus connected to the terminal via the network, storing first authentication data used for the first user authentication in association with second authentication data used for a second user authentication in a storage unit, and performing the second user authentication with respect to the system. In a case where at least a portion of the first authentication data is authenticated by the first user authentication, the second user authentication is performed by using the first and second authentication data stored in the storage unit and the portion of the first authentication data.

Other objects, features and advantages of the present invention will become more apparent from the following detailed description when read in conjunction with the accompanying drawings.

BRIEF DESCRIPTION OF THE DRAWINGS

FIGS. 5A and 5B are schematic diagrams illustrating examples of authentication data stored in an authentication data storage unit;

FIG. 6 is a block diagram illustrating an example of a configuration of a service providing system according to an embodiment of the present invention;

FIG. 7 is a schematic diagram illustrating an example of a configuration of company management data according to an embodiment of the present invention;

FIGS. 8A and 8B are schematic diagrams illustrating examples of user management data;

FIG. 9 is a schematic diagram illustrating an example of device management data;

FIG. 16 is a schematic diagram illustrating an example of a transition of screens in a case where a terminal device uses a service provided by a service providing system;

FIG. 17 is a sequence diagram illustrating an example of an operation performed in a case of inputting data from a terminal device;

FIG. 18 is a schematic diagram illustrating an example of data-management data stored in a data-management data storage unit;

FIGS. 19A and 19B are schematic diagrams illustrating examples of output data-management data managed by a printing service application;

FIG. 20 is a sequence diagram illustrating an example of an operation performed in a case of obtaining a data list from a service providing system or deleting data in a service providing system;

FIG. 26 is a block diagram illustrating an example of a configuration of a service providing system according to an embodiment of the present invention;

FIGS. 27A and 27B are schematic diagram illustrating examples of authentication data stored in an authentication data storage unit according to an embodiment of the present invention;

FIG. 28 is a schematic diagram illustrating an example of a configuration of user management data stored in a user management data storage unit according to an embodiment of the present invention;

FIGS. 31A and 31B are block diagrams illustrating examples of an office device according to an embodiment of the present invention.

DETAILED DESCRIPTION OF THE PREFERRED EMBODIMENTS

Next, embodiments of the present invention are described with reference to the accompanying drawings.
(First Embodiment)
<System Configuration>

Figure 1:
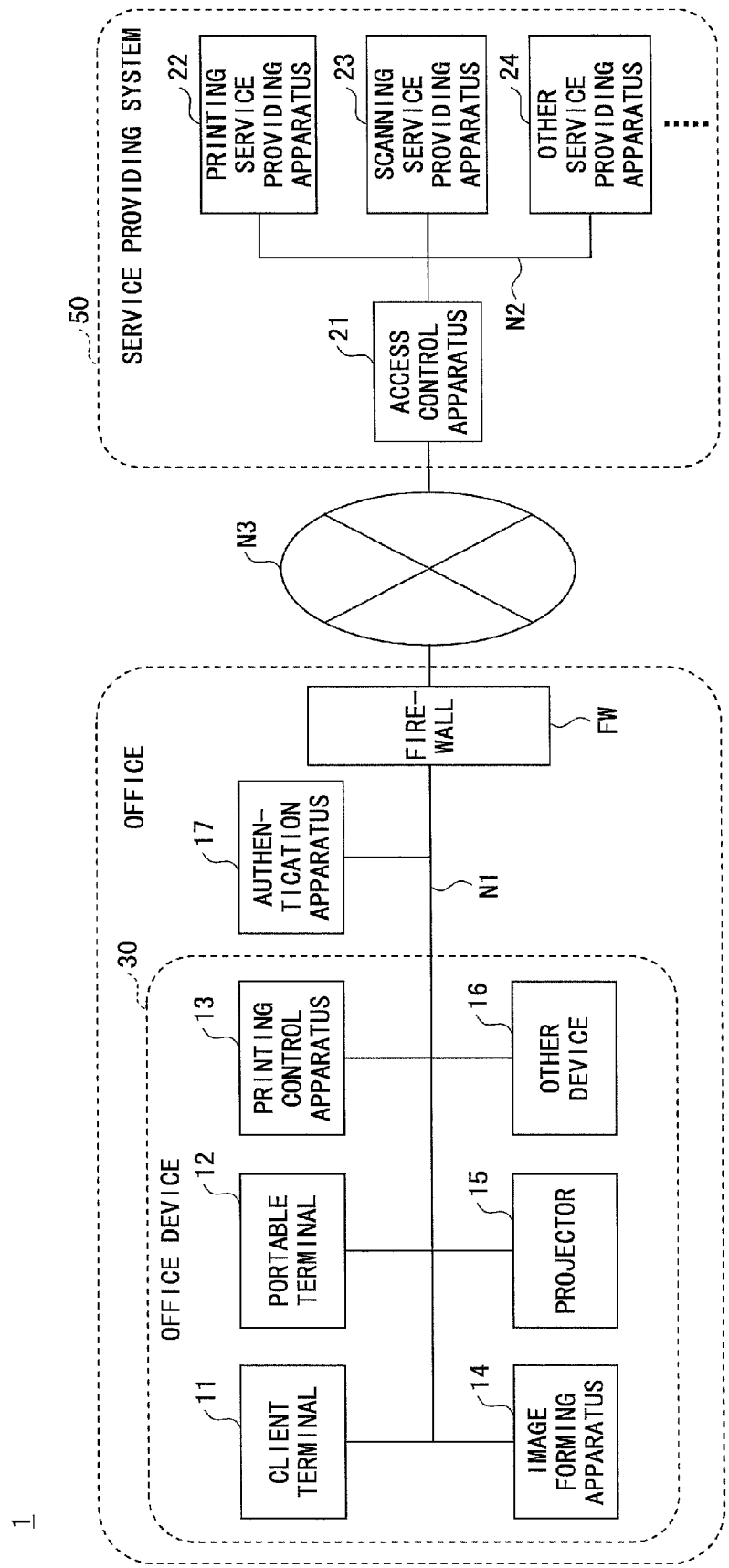
FIG. 1 is a schematic diagram illustrating an example of a system according to an embodiment of the present invention.

FIG. 1 is a schematic diagram illustrating an example of a system (e.g., network system) 1 according to an embodiment of the present invention. The system 1 of FIG. 1 includes, for example, a private network (e.g., in-house network) N1 (hereinafter also simply referred to as "first network N1"), a public network (e.g., cloud service) N2 (hereinafter also simply referred to as "second network N2"), and a network (e.g., the Internet) N3 (hereinafter also simply referred to as "third network N3").

The private network N1 and the public network N2 are connected to each other by a firewall FW provided on the side of the private network N1. The firewall FW, which is positioned at a connection (contact point) between the private network (first network) N1 and the third network N3, relays access from the private network N1 to the third network N3.

Further, the public network (second network) N2 and the third network N3 are connected to each other by an access control apparatus 21 provided on the side of the public network N2. The security of the public network N2 is protected by the access control apparatus 21.

In this embodiment, the private network N1 is a private network that is provided at an inner side of the firewall FW. A client terminal 11, a portable terminal 12, a printing control apparatus (e.g., printing server) 13, an image forming apparatus (e.g., multi-function machine) 14, a projector 15, one or more other devices 16, and an authentication apparatus (e.g., authentication server) 17 are connected to each other in the private network N1.

The client terminal 11 is an example of a terminal device. The client terminal 11 may be implemented by a data processing apparatus (computer system) having, for example, a typical OS (Operating System) installed therein. The client terminal 11 includes a wireless communication unit or a cable (wired) communication unit. The client terminal 11 is a terminal that can be operated by the user (e.g., tablet type PC (Personal Computer), a notebook type PC).

The portable terminal 12 is another example of a terminal device. The portable terminal 11 also includes a wireless communication unit or a cable (wired) communication unit. The portable terminal 12 is a terminal that can be carried by the user (e.g., smart phone, mobile phone, tablet type PC, notebook type PC).

The printing control apparatus may be implemented by a data processing apparatus (computer system) having, for example, a server OS installed therein. The printing control apparatus 13 also includes a wireless communication unit or a cable (wired) communication unit. The printing control apparatus 13 stores and provides, for example, printing data (data that is to be printed).

The image forming apparatus 14 is an apparatus that includes functions of an image forming device such as a multifunction device. That is, the image forming apparatus 14 is an apparatus that performs image forming processes of, for example, a multifunction device, a copier, a scanner, a printer (e.g., laser printer). The image forming apparatus 14 also includes a wireless communication unit or a cable (wired) communication unit. The projector 15 is an apparatus that projects an image(s). The projector 15 also includes a wireless communication unit or a cable (wired) communication unit.

It is to be noted that the client terminal 11, the portable terminal 12, the printing control apparatus 13, the image forming apparatus 14, the projector 15, and the other device 16 are examples of devices that perform authentication with the authentication apparatus 17 when used.

The authentication apparatus 17 may be implemented by a data processing apparatus (computer system) having, for example, a typical OS installed therein. The authentication apparatus 17 also includes a wireless communication unit or a cable (wired) communication unit. The authentication apparatus 17 is an apparatus that provides a user authentication function (e.g., authentication server).

Although a single client terminal 11, a single portable terminal 12, a single printing control apparatus 13, a single image forming apparatus 14, a single projector 15, a single other device 16, and a single authentication apparatus 17 are illustrated in the system 1 of FIG. 1, the system 1 may include multiple client terminals 11, multiple portable terminals 12, multiple printing control apparatuses 13, multiple image forming apparatuses 14, multiple projectors 15, multiple other devices 16, and multiple authentication apparatuses 17.

The public network N2 is connected to the third network (e.g., the Internet) N3 by the access control apparatus 21. An access control apparatus 21, a printing service providing apparatus 22, a scanning service providing apparatus 23, and an other-service providing apparatus 24 are connected to the public network N2. In the example of the system 1 of FIG. 1, a service providing system 50 may be implemented by the access control apparatus 21, the printing service providing apparatus 22, the scanning service providing apparatus 23, or the other service providing apparatus 24.

The access control apparatus 21 controls logging in to a service such as a printing service provided by the printing service providing apparatus 22 or a scanning service provided by the scanning service providing apparatus 23. The access control apparatus 21, the printing service providing apparatus 22, the scanning service providing apparatus 23, and the other service providing apparatus 24 may be implemented by one or more data processing apparatuses (computer systems).

Alternatively, the printing service providing apparatus 22, the scanning service providing apparatus 23, the other service providing apparatus 24 of the system 1 illustrated in FIG. 1 may be combined into a single computer and implemented by the single computer. Alternatively, the printing service providing apparatus 22, the scanning service providing apparatus 23, and the other service providing apparatus 24 may be decentralized to multiple computers and implemented by the multiple computers.

(Hardware Configuration)

Figure 2:
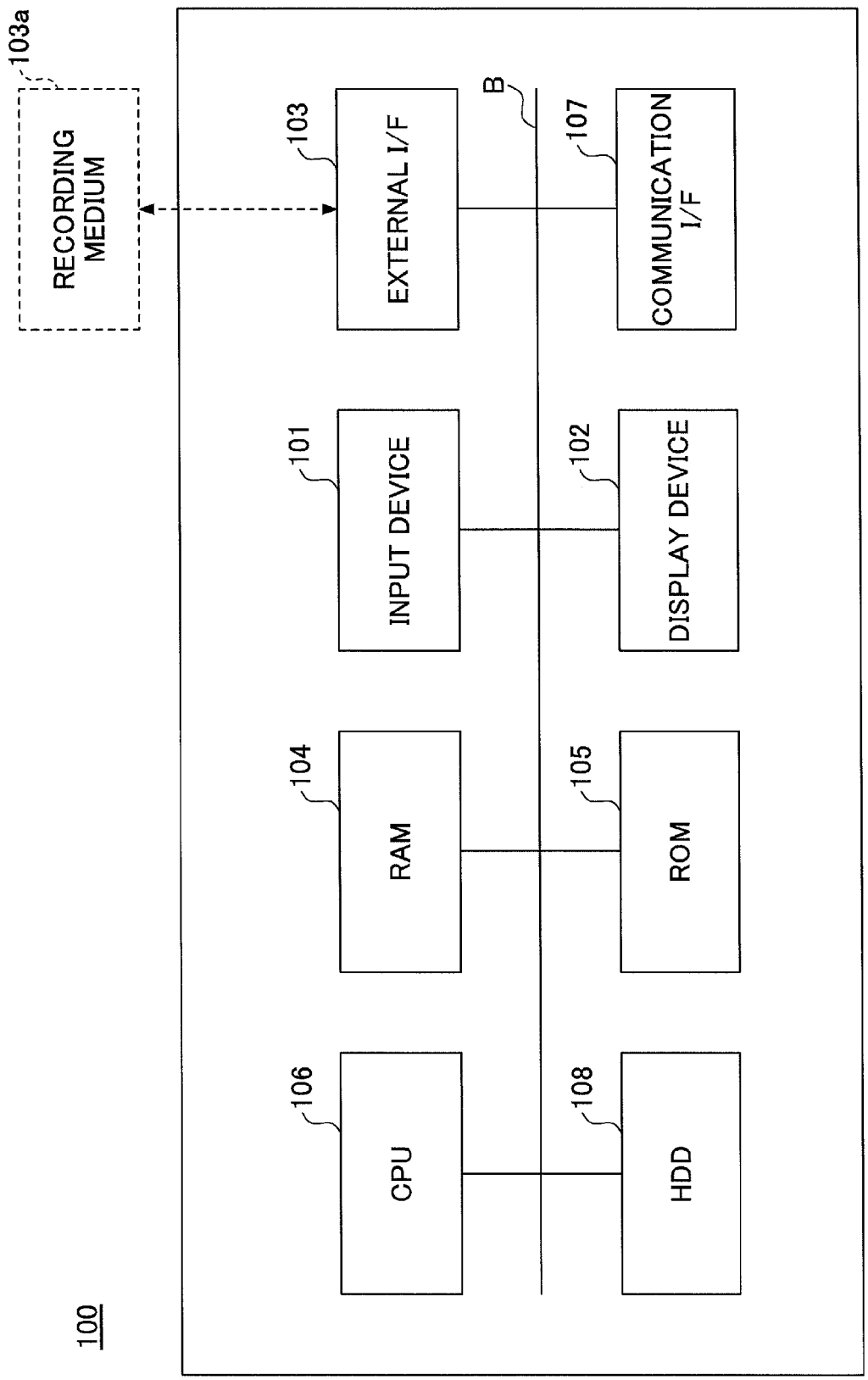
FIG. 2 is a schematic diagram illustrating an example of a hardware configuration of a computer system according to an embodiment of the present invention.

Each of the client terminal 11, the portable terminal 12, the printing control apparatus 13, the authentication apparatus 17, the access control apparatus 21, the printing service providing apparatus 22, the scanning service providing apparatus 23, and the other service providing apparatus 24 may be implemented by, for example, a computer system 100 having a hardware configuration illustrated in FIG. 2. FIG. 2 is a schematic diagram illustrating an example of a hardware configuration of a computer system 100 according to an embodiment of the present invention.

The computer system 100 illustrated in FIG. 2 includes, for example, an input device 101, a display device 102, an external I/F (interface) 103, a RAM (Random Access Memory) 104, a ROM (Read Only Memory) 105, a CPU (Central Processing Unit) 106, a communication I/F 107, and a HDD (Hard Disk Drive) 108 that are connected to each other by a bus B.

The input device 101 is, for example, a device to which a control signal is input from the user. The input device 101 may be, for example, a keyboard, a mouse, or a touch panel. The display device 102 is, for example, a display that displays results of processes performed by the computer system 100.

The communication I/F 107 is, for example, an interface that connects the computer system 100 to the private network N1 or the public network N2. Accordingly, the computer system 100 can perform data communications by way of the communication I/F 107.

The HDD 108 is, for example, a non-volatile storage device that stores programs and data therein. The programs and data stored in the HDD 108 may include, for example, basic software for controlling the entire computer system 100 (e.g., OS) and application for providing various function on the OS. The HDD 108 manages the stored programs and data by using a predetermined file system and/or a database (DB).

The external I/F 103 is, for example, an interface connected to an external device or the like. The external device or the like may be, for example, a recording medium 103a. Accordingly, the computer system 100 reads and/or writes data with respect to the recording medium 100 by way of the external I/F 103. The recording medium 103a may be, for example, a CD (Compact Disk), a DVD (Digital Versatile Disk) a SD (Secure Digital) memory card, or a USB (Universal Serial Bus) memory.

The ROM 105 is, for example, a non-volatile semiconductor memory (storage device) that can store programs and data even after switching off the power of the computer system 100. The programs and data stored in the ROM 105 may include, for example, a BIOS (Basic Input Output System) executed when activating the computer system 100, data pertaining to OS settings, and data pertaining to network settings. The RAM 104 is, for example, a volatile semiconductor memory (storage device) that temporarily stores programs and data therein.

The CPU 106 is, for example, a processor that implements the entire controls and functions of the computer system 100 by loading the stored programs and data from the above-described storage devices (e.g., ROM 105, HDD 108) to the RAM 104 and executing processes based on the loaded programs and data.

The client terminal 11, the portable terminal 12, the printing control apparatus 13, the authentication apparatus 17, the access control apparatus 21, the printing service providing apparatus 22, the scanning service providing apparatus 23, and the other service providing apparatus 24 can implement the below-described processes with the hardware configuration of the computer system 100.

(Software Configuration)

<Office Device>

Figure 3:
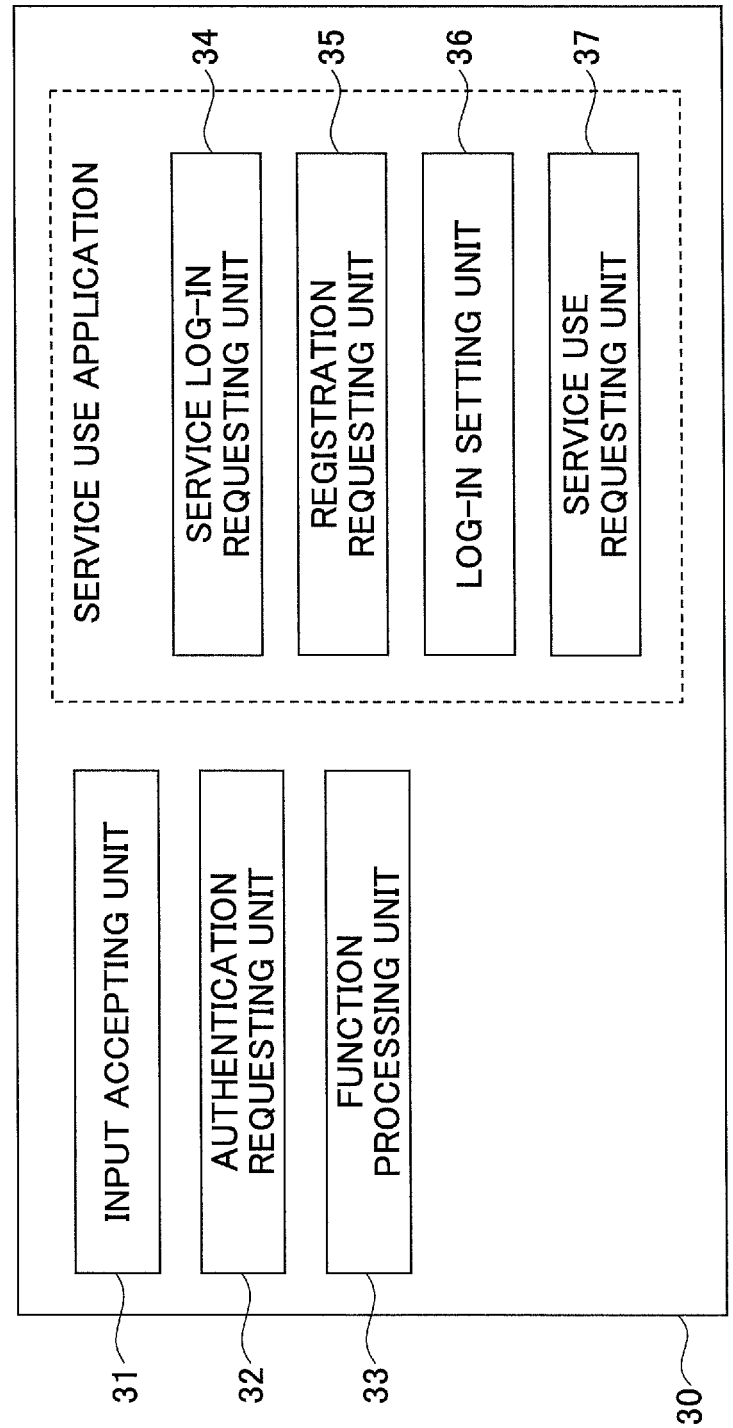
FIG. 3 is a block diagram illustrating an example of an office device according to an embodiment of the present invention.

In this embodiment, the client terminal 11 is one example of an office device 30 that is implemented by a configuration illustrated in FIG. 3.

FIG. 3 is a block diagram illustrating an example of the office device 30 according to an embodiment of the present invention.

The office device 30 includes, for example, an input accepting unit 31, an authentication requesting unit 32, a function processing unit 33, a service log-in requesting unit 34, a registration requesting unit 35, a log-in setting unit 36, and a service use requesting unit 37. The office device 30 executes a program(s) to implement the below-described functions/processes of the input accepting unit 31, the authentication requesting unit 32, the function processing unit 33, the service log-in requesting unit 34, the registration requesting unit 35, the log-in setting unit 36, and the service use requesting unit 37.

The input accepting unit 31 accepts input from operations performed by the user (e.g., operations performed on a touch panel, input operations performed on a keyboard). The authentication requesting unit 32 transmits authentication data to the authentication apparatus 17 and requests authentication to the authentication apparatus 17. The function processing unit 33 executes processes using hardware components and application programs (applications) included in the office device 30 to provide the functions of the office device 30.

The service log-in requesting unit 34, the registration requesting unit 35, the log-in setting unit 36, and the service use requesting unit 37 are implemented by, for example, a service use application. The service log-in requesting unit 34 transmits authentication data to the service providing system 50 and requests to log-in to the service providing system 50.

The registration requesting unit 35 requests the service providing system 50 to register a portion of the authentication data (e.g., user name) or the entire authentication data authenticated by the authentication apparatus 17.

The log-in setting unit 36 sets the authentication data to be used for logging in to the service providing system 50. The service use requesting unit 37 requests the use of a service provided by the service providing system 50.

<Authentication Apparatus>

Figure 4:
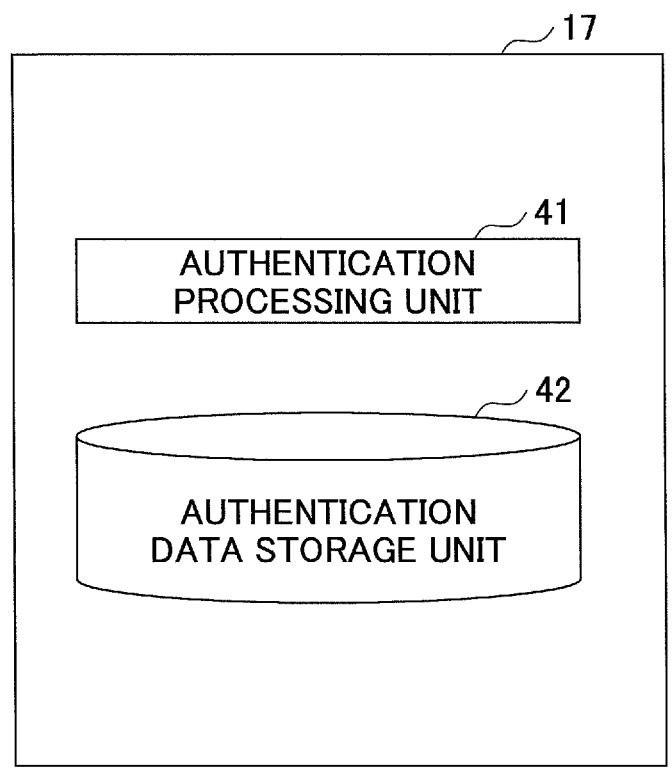
FIG. 4 is a block diagram illustrating an example of an authentication apparatus according to an embodiment of the present invention.

In this embodiment, the authentication apparatus 17 is implemented by a configuration illustrated in FIG. 4. FIG. 4 is a block diagram illustrating an example of the authentication apparatus 17 according to an embodiment of the present invention. The authentication apparatus 17 includes, for example, an authentication processing unit 41 and an authentication data storage unit 42. The authentication apparatus 17 executes a program(s) to implement the below-described functions/processes of the authentication processing unit 41 and the authentication data storage unit 42.

The authentication processing unit 41 executes an authentication process based on the authentication request from the office device 30. The authentication data storage unit 42 stores the authentication data to be used when determining a result of authenticating the authentication data received from the office device 30 (authentication result, e.g., failure of authentication, success of authentication). The authentication data storage unit 42 stores the authentication data as illustrated in, for example, FIGS. 5A and 5B.

FIGS. 5A and 5B are schematic diagrams illustrating examples of the authentication data stored in the authentication data storage unit 42. FIG. 5A illustrates an example of authentication data constituted by user identification data (e.g., user name) and passwords. FIG. 5B illustrates another example of authentication data constituted by user identification data, passwords, and card identification data of an IC card (e.g., card ID). It is, however, to be noted that the configuration of the authentication data is not limited to those illustrated in FIGS. 5A and 5B. For example, device identification data of the office device 30 (e.g., device number) or biometric data of the user (e.g., fingerprint data, vein data, retinal data) may be used as the authentication data.

<Service Providing System>

The service providing system 50 may be implemented by a configuration illustrated in FIG. 6. FIG. 6 is a block diagram illustrating an example of a configuration of the service providing system 50 according to an embodiment of the present invention. The service providing system 50 of FIG. 6 includes a service application 51, a platform 52, a management data storage unit 53, and a platform API (Application Programming Interface) 54. The service providing system 50 executes a program(s) to implement the below-described functions/processes of the service application 51, the platform 52, the management data storage unit 53, and the platform API 54.

The service application 51 of FIG. 6 includes, for example, a printing service application 61, a scanning service application 62, and one or more other service applications 63. The printing service application 61 is an application that provides a printing service. The scanning service application 62 is an application that provides a scanning service. The other service application 63 is an application that provides a service other than those described above.

The platform API 54 is an interface that enables the service application 51 (e.g., printing service application 61, scanning service application 62, other service application 63) to use the platform 52. The platform API 54 is an interface defined beforehand to enable the platform 52 to receive requests from the service application 51. For example, the platform API 54 may be defined to include functions and/or classes. In a case where the service providing system 50 is constituted by multiple data processing apparatuses, a Web API, which can be used by way of a network, may be used as the platform API 54.

The platform 52 of FIG. 6 includes, for example, an authentication process unit 71, a device communication unit 72, a user data registration unit 73, a session management unit 74, and a data process unit 75. The authentication process unit 71 executes authentication based on a log-in request from the office device 30.

The device communication unit 72 executes communication with the office device 30. The user data registration unit 73 receives a portion of the authentication data or the entire authentication data authenticated by the authentication apparatus 17 from a terminal device (e.g., client terminal 11) and registers the received authentication data as the below-described user management data. The session management unit 74 manages a session(s) between the office device 30. The data process unit 75 executes a data process based on a request from the service application 51.

The management data storage unit 53 includes a company management data storage unit 81, a user management data storage unit 82, a device management data storage unit 83, a data-management data storage unit 84, and an other-data storage unit 85. The company management data storage unit 81 stores the below-described company management data therein. The user management data storage unit 82 stores the below-described user management data therein. The device management data storage unit 83 stores the below-described device management data therein. The data-management data storage unit 84 stores the below-describe data-management data therein. The other-data storage unit 85 stores other data therein.

FIG. 7 is a schematic diagram illustrating an example of a configuration of the company management data according to an embodiment of the present invention. The company management data of FIG. 7 includes data items such as "company code", "company name", "country", and "language". The "company name" is data that identifies a group such as a company or an organization.

The "company code" is data that identifies a collection (aggregate) of one or more users or a collection (aggregate) of one or more office devices 30. It is to be noted that the term "company" is not limited to its literal meaning. For example, "company code" may include identification data that identifies a contract corresponding to a collection (aggregate) of users or office devices 30. It is to be noted that the "company code" is unique.

FIGS. 8A and 8B are schematic diagrams illustrating examples of the user management data. The company management data of FIG. 7 includes data items such as "company code", "user name", "password", "role", "address data", "output setting", and "office authentication data". The date items included in the user management data may be managed in units of company codes. The "user name" and "password" are data for identifying a user from the side of the service providing system 50. The "user name" may be, for example, a user ID. The "password" is optional.

Further, the "user name" may be data that identifies an electronic medium carried by the user (e.g., IC card), data that identifies the office device 30 (e.g., card ID, serial ID, or telephone number corresponding to the office device 30), or a combination thereof. Although the "user name" and "password" associated with the "company code" are unique, there may be an overlap of user names or passwords if different company codes are associated with the user names and passwords.

The "office authentication data" is user identification data included in the authentication data of the side of the private network (first network) N1. The user identification data of the side of the private network N1, which is registered as the office authentication data, is user authentication data authenticated on the side of the private network N1. The office authentication data is registered by the user data registration unit 73. The user management data associates the user identification data (user name) of the side of the private network N1 with the user name of the side of the public network (second network) N2.

With the user management data, the system 1 of this embodiment can coordinate the authentication of the side of the private network N1 and the authentication of the side of the public network N2 while maintaining security of the private and public networks N1, N2.

FIG. 8A illustrates an example of the user management data in a case where the office authentication data of user name "Kobayashi" is not yet registered in the user management data. The user management data of FIG. 8A represents an example in which the authentication of the side of the private network N1 and the authentication of the side of the public network N2 are not associated (coordinated) with each other.

FIG. 8B illustrates an example of the user management data in a case where the office authentication data of user name "Kobayashi" has been registered in the user management data. The user management data of FIG. 8B represents an example in which the authentication of the side of the private network N1 and the authentication of the side of the public network N2 are coordinated with each other.

FIG. 9 is a schematic diagram illustrating an example of the device management data. The device management data of FIG. 9 includes data items such as "company code", "device authentication data", "office data", and "capability data". The data items included in the device management data may be managed in units of company codes. The device authentication data is data used for device authentication in which it is determined whether the office device 30 has (satisfies) a predetermined condition. The device authentication data may be data that indicates a predetermined application is installed in the office device 30 or a device number that indicates that the office device 30 is a predetermined device.

<Details of Processes of System>

Next, the processes performed with the system 1 of the first embodiment are described in further detail.

<Log-in Setting>

Figure 10:
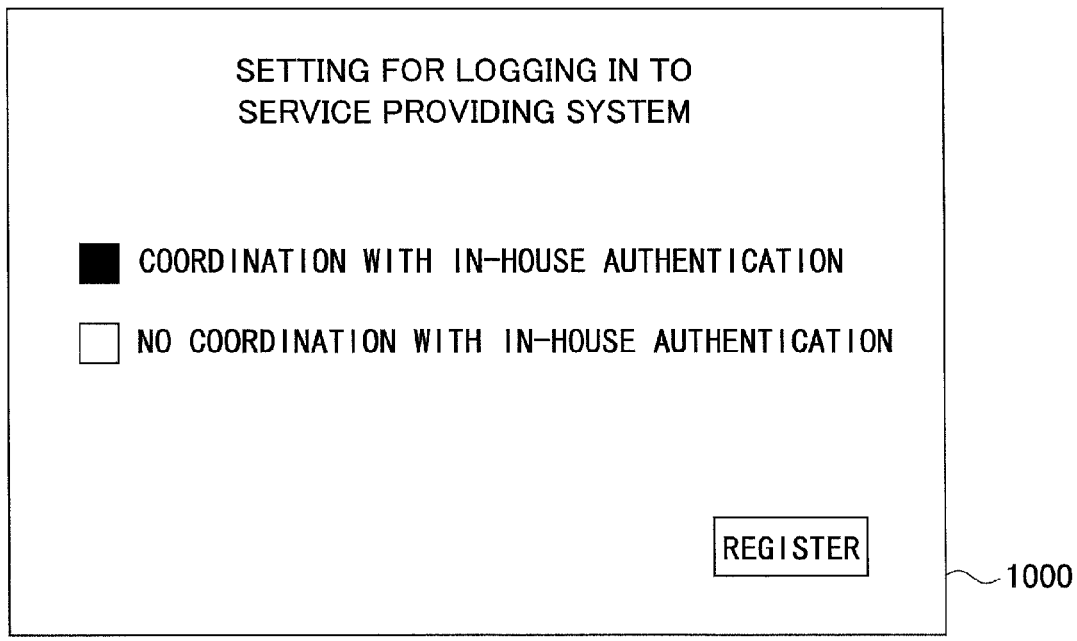
FIG. 10 is a schematic diagram illustrating an example of a log-in setting screen that is used for logging in to a service providing system according to an embodiment of the present invention.

FIG. 10 is a schematic diagram illustrating an example of a log-in setting screen 1000 that is used for logging in to the service providing system 50 according to an embodiment of the present invention. The log-in setting screen 1000 of FIG. 10 is displayed on the office device 30 by the service use application of the office device 30. The log-in setting screen 1000 is a screen for allowing the user to select between a log-in setting "coordination with in-house authentication" and a log-in setting "no coordination with in-house authentication". The log-in setting "coordination with in-house authentication" indicates that authentication of the side of the private network N1 and authentication of the side of the public network N2 are to be coordinated with each other. The log-in setting "no coordination with in-house authentication" indicates that authentication of the side of the private network N1 and authentication of the side of the public network N2 are not to be coordinated with each other.

<Log-in Process>

Figure 11:
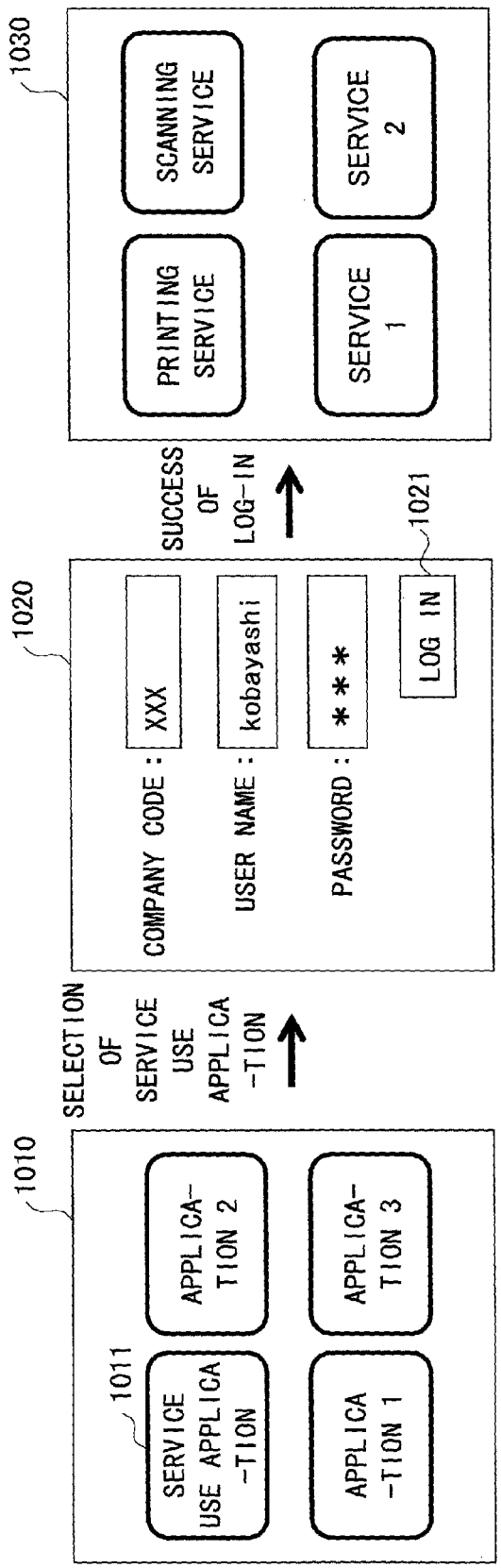
FIG. 11 is a schematic diagram illustrating an example of a transition of screens in a case where a log-in setting "no coordination with in-house authentication" is selected.

In a case where the log-in setting "no coordination with in-house authentication" is selected, the screen illustrated in FIG. 10 changes to the screens illustrated in FIG. 11. FIG. 11 is a schematic diagram illustrating an example of a transition of screens in a case where the log-in setting "no coordination with in-house authentication" is selected.

For example, the office device 30 displays an application selection screen 1010 to allow the user to select an application. In a case where the user presses a service use application selection button 1011, the office device 30 displays a log-in screen 1020 by way of the service use application of the office device 30. Then, the user inputs a company code, a user name, and a password in the log-in screen 1020. The company code, the user name, and the password are examples of authentication data of the side of the public network N2.

After the authentication data are input in the log-in screen 1020 by the user, the user presses a log-in button 1021 in the log-in screen 1020. When the log-in button 1021 is pressed, the service log-in requesting unit 34 of the office device 30 transmits the authentication data to the service providing system 50 to request log-in to the service providing system 50.

When the log-in is a success, the service use application of the office device 30 displays a service list selection screen 1030. The service list selection screen 1030 is a screen for allowing the user to select a desired service from the service list selection screen 1030. For example, in a case where the user presses a button "printing service", the service use requesting unit 37 of the office device 30 requests the use of "printing service" to the service providing system 50.

Figure 12:
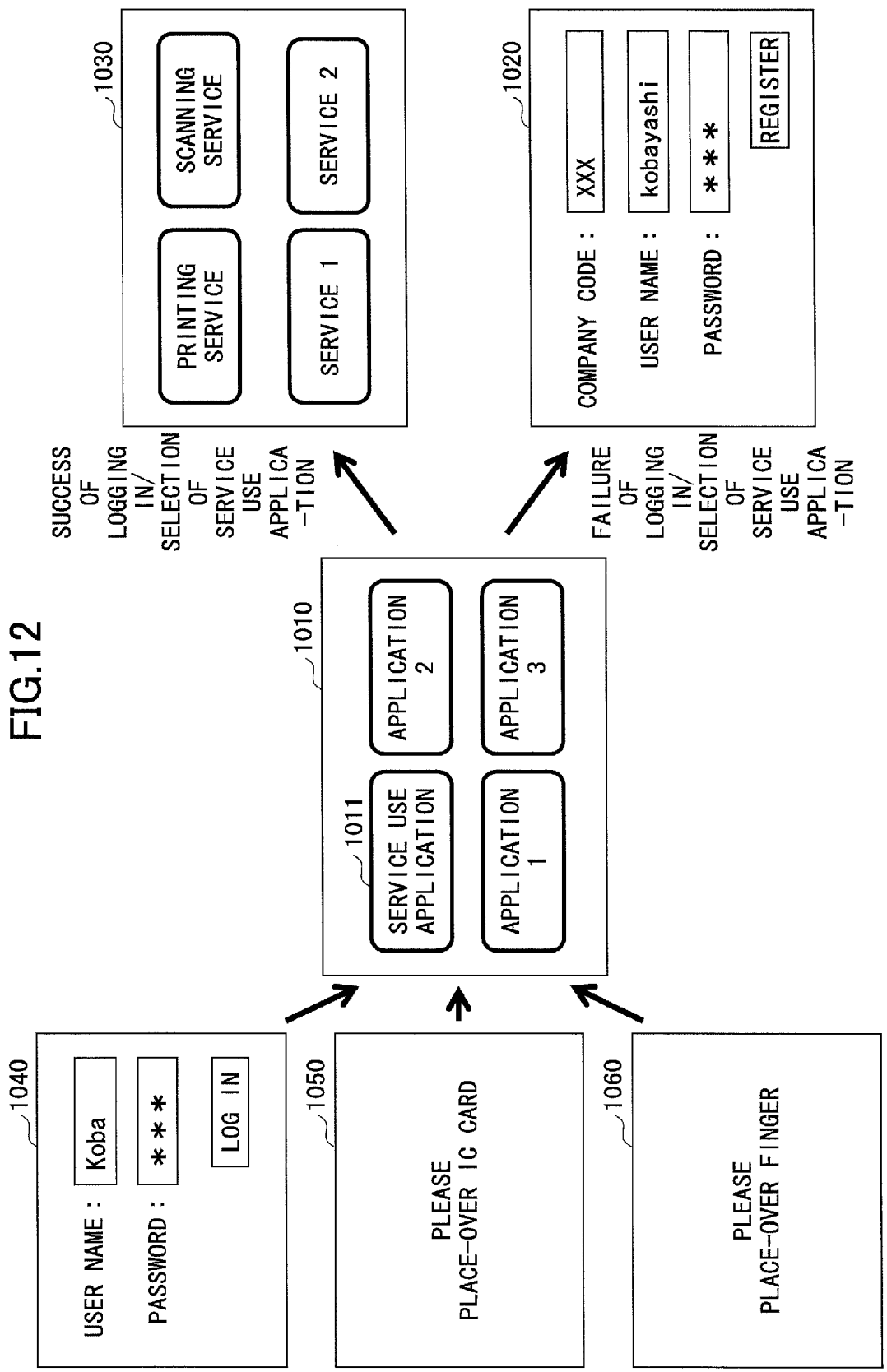
FIG. 12 is a schematic diagram illustrating an example of a transition of screens in a case where a log-in setting "coordination with in-house authentication" is selected.

In a case where the log-in setting "coordination with in-house authentication" is selected, the screen illustrated in FIG. 10 changes to the screens illustrated in FIG. 12. FIG. 12 is a schematic diagram illustrating an example of a transition of screens in a case where the log-in setting "coordination with in-house authentication" is selected.

For example, the office device 30 displays one of the log-in screens (authentication log-in screens) 1040, 1050, 1060 of the side of the private network N1. The log-in screen 1040 is a screen for allowing the user to input authentication data (e.g., user name, password). The log-in screen 1050 is a screen for allowing the user to input authentication data (e.g., card identification data of an IC card (card ID)) by placing the IC card over the office device 30. The log-in screen 1060 is a screen for allowing the user to input authentication data (e.g., biometric data (in this example, fingerprint data)) by placing the user's finger over the office device 30.

When the authentication data is input, the authentication requesting unit 32 of the office device 30 transmits the authentication data to the authentication device 17 to request authentication. When the authentication is a success, the office device 30 displays the application selection screen 1010 to allow the user to select an application.

When the user presses the service use application selection button 1011, the service use application of the office device 30 transmits the company code along data that has been authenticated on the side of the private network N1 (in this embodiment, user name) as authentication data to the service providing system 50 to request log-in to the service providing system 50. In a case where device authentication data is set to the office device 30, the device authentication data is included in the authentication data transmitted to the service providing system 50.

In a case where user identification data (user name) authenticated on the side of the private network N1 and the user name of the side of the public network N2 are associated with each other in the user management data, the log-in to the service providing system 50 is a success. When the log-in to the service providing system 50 is a success, the service use application of the office device 30 displays the service list selection screen 1030.

In a case where user identification data (user name) authenticated on the side of the private network N1 and the user name of the side of the public network N2 are not associated with each other in the user management data, the log-in to the service providing system 50 is a failure. When the log-in to the service providing system 50 is a failure, the service user application of the office device 30 displays the log-in screen 1020 to allow the user to input authentication data of the side of the public network N2. Then, the service log-in requesting unit 34 of the office device 30 transmits the input authentication data of the side of the public network N2 to the service providing system 50 to request log-in to the service providing system 50.

In a case where user name authenticated on the side of the private network N1 and the user name of the side of the public network N2 are associated with each other in the user management data, the user can select a desired service from the service list selection screen 1030 without having to input the authentication data of the side of the public network N2 into the log-in screen 1020. Thereby, the user can select a service provided by the service providing system 50.

Figure 13:
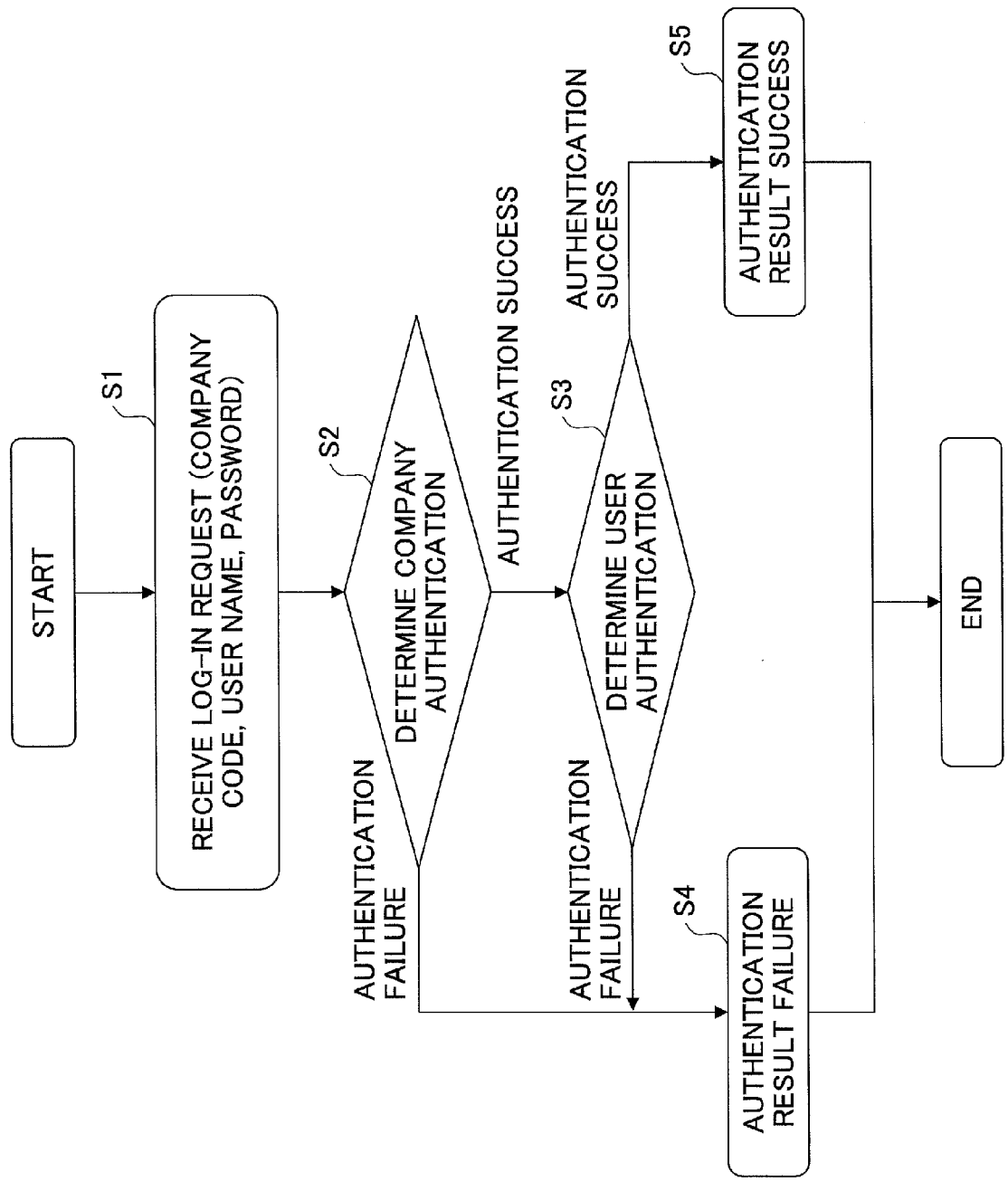
FIG. 13 is a flowchart illustrating an example of processes performed by a service providing system that has received a log-in request from a terminal device.

FIG. 13 is a flowchart illustrating an example of processes performed by the service providing system 50 that has received a log-in request from a terminal device (in this example, client terminal 11). The example of FIG. 13 is a case where the log-in setting "no coordination with in-house authentication" is selected.

In Step S1, the authentication process unit 71 of the service providing system 50 receives a log-in request including authentication data (in this example, company code, user name of the side of the public network N2, password) from a terminal device such as the client terminal 11.

In Step S2, the authentication process unit 71 performs company authentication determination. That is, the authentication process unit 71 determines whether the company code included in the received authentication data exists in the company management data illustrated in FIG. 7. In a case where the company code exists in the company management data illustrated in FIG. 7, the authentication process unit 71 determines that the company authentication determination is a success (authentication success) and proceeds to a process of Step S3.

In Step S3, the authentication process unit 71 performs user authentication determination. That is, the authentication process unit 71 determines whether the user name and password included in the received authentication data exist in the user management data (see FIG. 8A or 8B) associated with the authenticated company code.

In a case where the user name and the password exist in the user management data, the authentication process unit 71 determines that the user authentication determination is a success (authentication success) and proceeds to a process of Step S5.

In Step S5, the authentication process unit 71 determines that the result of authenticating the log-in request is a success (authentication result success).

On the other hand, in Step S3, in a case where the user name and the password do not exist in the user management data associated with the authenticated company code, the authentication process unit 71 determines that the result of authenticating the log-in request is a failure (authentication result failure) in Step S4.

Figure 14:
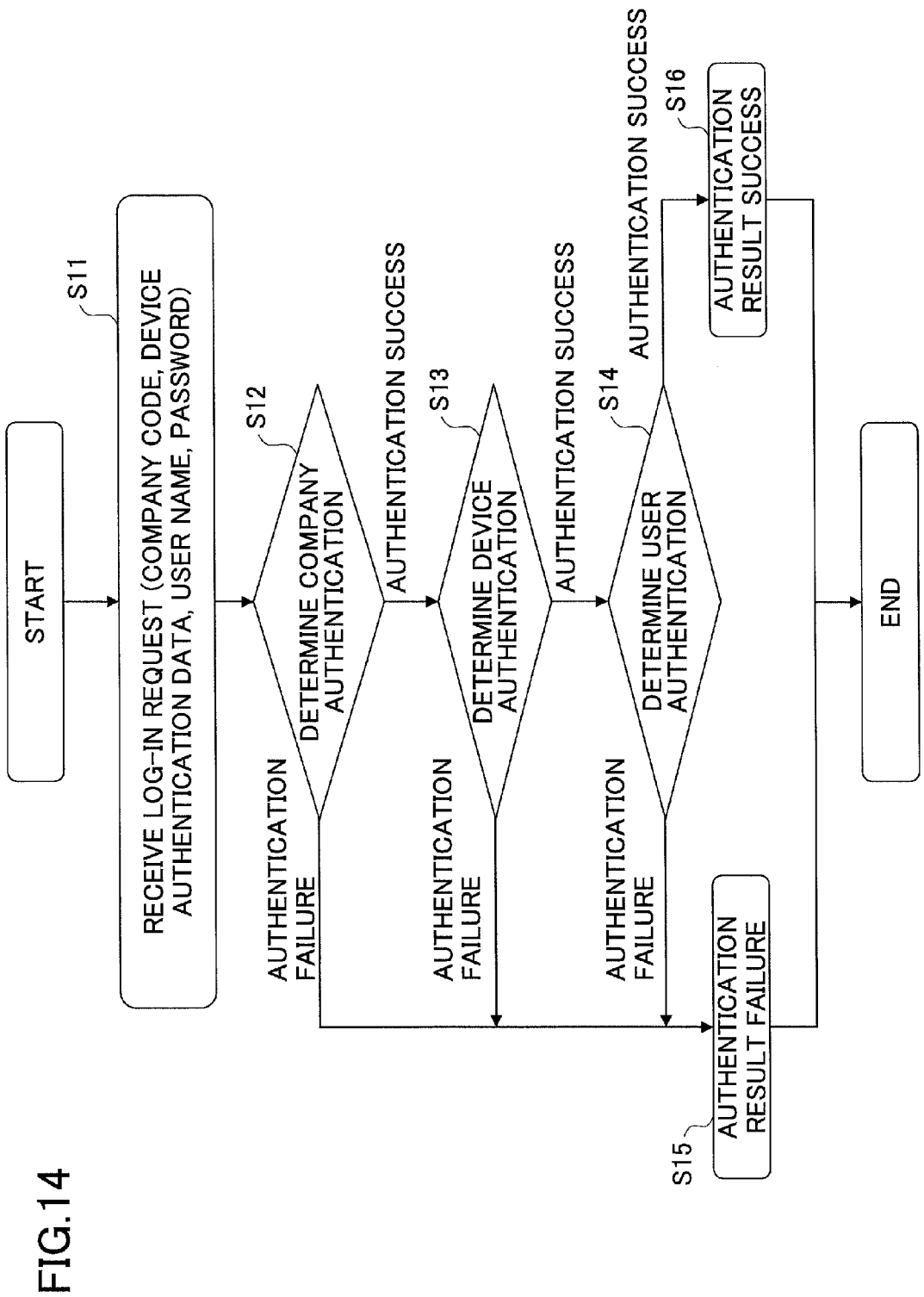
FIG. 14 is a flowchart illustrating an example of processes performed by a service providing system that has received a log-in request from an image forming apparatus.

FIG. 14 is a flowchart illustrating an example of processes performed by the service providing system 50 that has received a log-in request from the image forming apparatus 14. The example of FIG. 14 is a case where the log-in setting "no coordination with in-house authentication" is selected. In comparison with the flowchart of FIG. 13, a process "device authentication determination" is added in the flowchart of FIG. 14.

In Step S11, the authentication process unit 71 of the service providing system 50 receives a log-in request including authentication data (in this example, company code, device authentication data, user name of the side of the public network N2, password) from the image forming apparatus 14.

In Step S12, the authentication process unit 71 performs company authentication determination. That is, the authentication process unit 71 determines whether the company code included in the received authentication data exists in the company management data illustrated in FIG. 7. In a case where the company code exists in the company management data illustrated in FIG. 7, the authentication process unit 71 determines that the company authentication determination is a success (authentication success) and proceeds to a process of Step S13.

In Step S13, the authentication process unit 71 performs device authentication determination. That is, the authentication process unit 71 determines whether the device authentication data included in the received authentication data exists in the user management data (see FIG. 9) associated with the authenticated company code. In a case where the device authentication data exists in the user management data, the authentication process unit 71 determines that the device authentication determination is a success (authentication success) and proceeds to a process of Step S14.

In Step S14, the authentication process unit 71 performs user authentication determination. That is, the authentication process unit 71 determines whether the user name and password included in the received authentication data exist in the user management data (see FIG. 8A or 8B) associated with the authenticated company code.

In a case where the user name and the password exist in the user management data, the authentication process unit 71 determines that the user authentication determination is a success (authentication success) and proceeds to a process of Step S16. In Step S16, the authentication process unit 71 determines that the result of authenticating the log-in request from the image forming apparatus 14 is a success (authentication result success).

On the other hand, in Step S12, in a case where the company code does not exist in the company management data of FIG. 7, the authentication process unit 71 determines that the result of authenticating the log-in request from the image forming apparatus 14 is a failure (authentication result failure).

Likewise, in Step S13, in a case where the device authentication data does not exist in the device management data associated with the authenticated company code, the authentication process unit 71 determines that the result of authenticating the log-in request from the image forming apparatus 14 is a failure (authentication result failure).

Likewise, in Step S14, in a case where the user name and password do not exist in the user management data associated with the authenticated company code, the authentication process unit 71 determines that the result of authenticating the log-in request from the image forming apparatus 14 is a failure (authentication result failure).

Figure 15A:
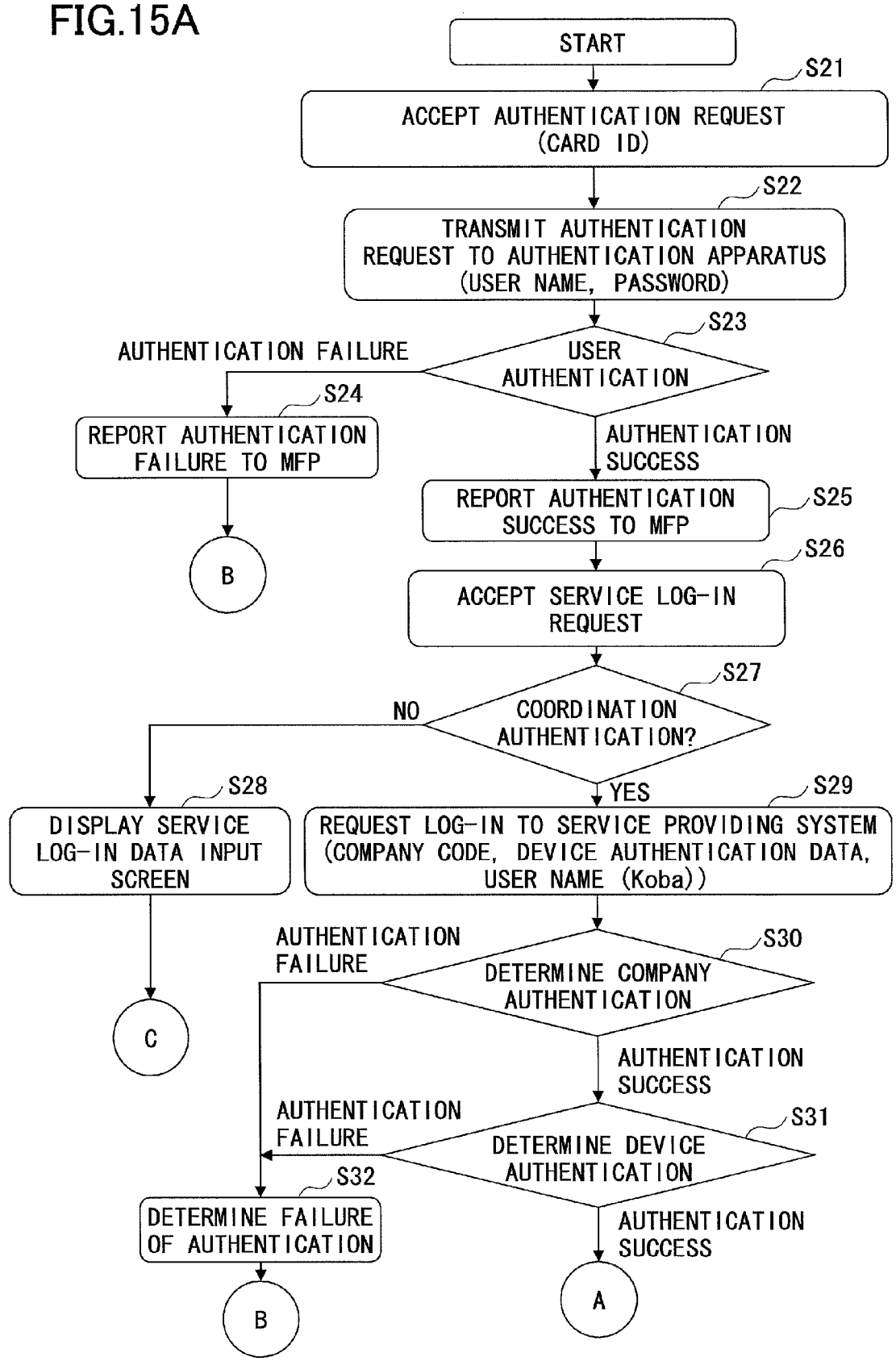
FIGS. 15A and 15B are flowchart illustrating examples of a log-in operation performed by a system according to an embodiment of the present invention.
Figure 15B:
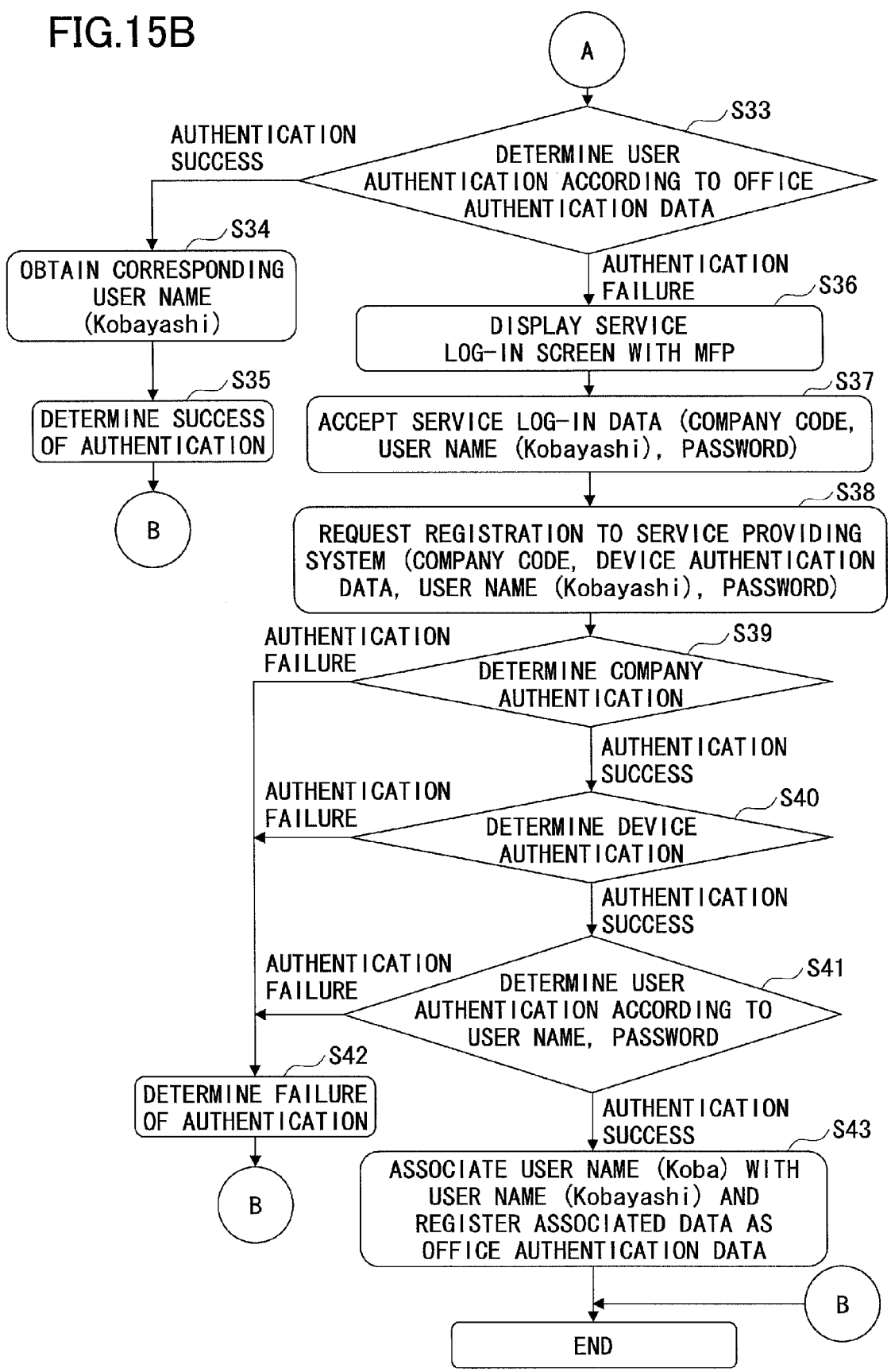

FIG. 15 is a flowchart illustrating an example of a log-in operation performed by the system 1 according to an embodiment of the present invention. In Step S21, the image forming apparatus 14 displays, for example, the log-in screen 1050 illustrated in FIG. 12. The image forming apparatus 14 accepts an authentication request from the user by receiving authentication data (in this example, card ID of an IC card) input by the user.

In Step S22, the authentication requesting unit 32 of the image forming apparatus 14 transmits the authentication data to the authentication apparatus 17 and requests authentication to the authentication apparatus 17. It is to be noted that the authentication data transmitted to the authentication apparatus 17 is not limited to the card ID of the IC card of the user. That is, the authentication data transmitted to the authentication apparatus 17 may also include a user name and/or a password associated with the card ID.

In Step S23, the authentication processing unit 41 of the authentication apparatus 17 performs user authentication. That is, the authentication processing unit 41 determines whether the user name and the password included in the authentication data received from the image forming apparatus 14 exist in the authentication data illustrated in FIG. 5A or 5B. In a case where the user name and the password exist in the authentication data illustrated in FIG. 5A or 5B, the authentication processing unit 41 determines that the user authentication is a success (authentication success) and proceeds to a process of Step S25. In Step S25, the authentication processing unit 41 reports the success of the user authentication to the authentication requesting unit 32 of the image forming apparatus 14.

In a case where the user name and the password do not exist in the authentication data illustrated in FIG. 5A or 5B, the authentication processing unit 41 determines that the user authentication is a failure (authentication failure) and proceeds to a process of Step S24. In Step S24, the authentication processing unit 41 reports the failure of the user authentication to the authentication requesting unit 32 of the image forming apparatus 14. Accordingly, the operation of the flowchart of FIG. 15 is terminated.

In Step S26, the image forming apparatus 14 that has received the report of the success of the user authentication displays the application selection screen 1010 (see FIG. 12) to allow the user to select an application. For example, the image forming apparatus 14 accepts a request for logging in to the service providing system 50 (log-in request) from the user when the user presses the service use application selection button 1011 in the application selection screen 1010.

In Step S27, the service log-in requesting unit 34 of the image forming apparatus 14 determines whether the log-in setting "no coordination with in-house authentication" is selected. In a case where the log-in setting "no coordination with in-house authentication" is selected, the image forming apparatus 14 displays the log-in screen 1020 (see FIG. 11) in Step S28 to allow the user to input a company code, a user name of the side of the public network N2, and a password. After the process of Step S28, the image forming apparatus 14 logs in to the service providing system 50 when the processes of the flowchart of FIG. 14 are a success (authentication success).

In Step S27, the service log-in requesting unit 34 performs a process of Step S29 in a case where the log-in setting "coordination with in-house authentication" is selected. In Step S29, the service log-in requesting unit 34 transmits authentication data (in this example, company code, device authentication data, user name (Koba)) to the service providing system 50 to request log-in to the service providing system 50.

As illustrated in FIGS. 5A and 5B, the user name (Koba) is an example of the user name of the side of the private network N1. In Step S30, the authentication process unit 71 of the service providing system 50 performs the company authentication determination (see, for example, Step S12 of FIG. 14). The authentication process unit 71 proceeds to a process of Step S31 when the company authentication determination is a success (authentication success).

In Step S31, the authentication process unit 71 performs the device authentication determination (see, for example, Step S13 of FIG. 14). The authentication process unit 71 proceeds to a process of Step S33 when the device authentication determination is a success (authentication success).

On the other hand, in a case where the company authentication determination is a failure in Step S30 (authentication failure), the authentication process unit 71 determines that authentication in response to the log-in from the image forming apparatus 14 is a failure in Step S32. Further, in a case where the device authentication determination is a failure in Step S31 (authentication failure), the authentication process unit 71 determines that authentication in response to the log-in from the image forming apparatus 14 is a failure in Step S32.

In Step S33, the authentication process unit 71 performs the user authentication determination. That is, the authentication process unit 71 determines whether the user name of the side of the private network N1 (Koba) included in the authentication data exists in the user management data associated with the authenticated company code.

In a case where the user name of the side of the private network N1 (Koba) exists, the authentication process unit 71 determines that the user authentication determination is a success (authentication success) and proceeds to a process of Step S34. In Step S34, the authentication process unit 71 obtains the user name of the side of the public network (Kobayashi) corresponding to the user name of the side of the private network N1 (Koba) from the user management data as illustrated in FIG. 8B. In Step S35, the authentication process unit 71 determines that authentication in response to the log-in request from the image forming apparatus 14 is a success (authentication success).

On the other hand, in a case where the user name of the side of the private network N1 (Koba) does not exist, the authentication process unit 71 determines that the user authentication determination is a failure (authentication failure) and proceeds to the process of Step S36.

In Step S36, the service use application of the image forming apparatus 14 displays the log-in screen 102 (see FIG. 12) because of the failure of logging in to the service providing system 50.

Then, in Step S37, the service use application of the image forming apparatus 14 accepts a log-in request from the user by receiving input of authentication data of the side of the public network N2 (in this example, company code, user name (Kobayashi), password) from the user.

In Step S38, the registration requesting unit 35 of the image forming apparatus 14 sends a registration request to the service providing system 50. The registration request is for requesting the service providing system 50 to register the user name that has been authenticated on the side of the private network N1 (Koba). The registration request of Step S38 includes a company code, device authentication data, a user name of the side of the public network N2 (Kobayashi), and a password.

In Step S39, the authentication process unit 71 of the service providing system 50 performs the company authentication determination (see, for example, Step S12 of FIG. 14).

The authentication process unit 71 proceeds to a process of Step S40 when the company authentication determination is a success (authentication success).

In Step S40, the authentication process unit 71 performs the device authentication determination (see, for example, Step S13 of FIG. 14). The authentication process unit 71 proceeds to a process of Step S41 when the device authentication determination is a success (authentication success).

In Step S41, the authentication process unit 71 performs the user authentication determination (see, for example, Step S14 of FIG. 14). The authentication process unit 71 proceeds to a process of Step S43 when the user authentication determination is a success (authentication success).

In Step S43, the user data registration unit 73 registers the user name authenticated on the side of the private network N1 (Koba) as office authentication data of the user management data. In the registration of the user name authenticated on the side of the private network N1 (Koba), the user data registration unit 73 associates the user name authenticated on the side of the private network N1 (Koba) to the user name of the side of the public network N2 (Kobayashi).

On the other hand, in a case where the authentication process unit 71 determines that the company authentication determination of Step S39, the device authentication determination of Step S40, or the user authentication determination of Step S41 is a failure (authentication failure), the authentication process unit 71 determines that authentication in response to the registration request from the image forming apparatus 14 is a failure in Step S42.

As illustrated in the flowchart of FIG. 15, in a case where the user name authenticated on the side of the private network N1 (Koba) and the user name of the side of the public network N2 (Kobayashi) are associated to each other in the user management data, the user can log in to the service providing system 50 without having to input the authentication data of the side of the public network N2 to the log-in screen 1020 by setting the authentication data of the public network N2 to the log-in setting unit 36 beforehand.

Further, even in a case where the user name authenticated on the side of the private network N1 (Koba) and the user name of the side of the public network N2 (Kobayashi) are not associated to each other in the user management data, user management data that associates the user name authenticated on the side of the private network N1 (Koba) and the user name of the side of the public network N2 (Kobayashi) can be easily registered.

<Service Use Process>

In a case where a terminal device (e.g., client terminal 11) uses a service provided by the service providing system 50, the screen of the terminal device changes to the screens illustrated in FIG. 16. FIG. 16 is a schematic diagram illustrating an example of a transition of screens in a case where the terminal device uses a service provided by the service providing system 50.

For example, the client terminal 11 displays the service list selection screen 1030 to allow the user to select a service provided by the service providing system 50. For example, the service use application of the client terminal 11 displays a printing service screen 1100 or 1110 when a button "printing service" 1031 in the service list selection screen 1030 is pressed.

The printing service screen 1100 is an example of a screen that allows data (e.g., printing job) to be transmitted from the client terminal 11. The user can transmit a printing job or the like to the service providing system 50 by setting data (e.g., printing job) on the printing service screen 1100 and pressing the transmit button 1101 in the printing service screen 1100.

The printing service screen 1110 is an example of a screen that displays a list of data (e.g., printing jobs) that has been transmitted to the service providing system 50. The user can update the data list displayed on the printing service screen 1110 or delete data (e.g., printing job) from the data list displayed on the printing service screen 1110 by pressing an update button 1111 or a delete button 1112 in the printing service screen 1110. Because the printing service screen 1110 of the example of FIG. 16 illustrates a case where an administrator is a user, multiple users are displayed in the data list of the printing service screen 1110.

FIG. 17 is a sequence diagram illustrating an example of an operation performed in a case of inputting data (e.g., printing job) from the terminal device (e.g., client terminal 11). In Step S51, the input accepting unit 31 of the terminal device accepts a log-in request from the user, for example, when the user presses the service use application selection button 1011 of the application selection screen 1010. The input accepting unit 31 requests the service log-in requesting unit 34 to request log-in to the service providing system 50.

Then, in Step S52, the service log-in requesting unit 34 requests log-in to the authentication process unit 71 of the service providing system 50. In Step S53, the authentication process unit 71 performs authentication as described above. In Step S54, the authentication process unit 71 transmits an authentication result in response to the log-in request to the service log-in requesting unit 34 of the terminal device. In a case where the authentication is a success (authentication success), the authentication process unit 71 also transmits a token (cookie) to the service log-in requesting unit 34 of the terminal device. The service providing system 50 stores the token in association with the authenticated user name of the user and the company code.

The process in Step S55 and the processes after Step S55 are performed in a case of inputting data to the service providing system 50 when authentication is a success (authentication result success). In Step S55, the input accepting unit 31 of the terminal device accepts data (e.g., data settings) to be input (entered) to the service providing system 50 by way of, for example, the printing service screen 1100 of FIG. 16.

In Step S56, the input accepting unit 31 requests the service use requesting unit 37 to request inputting of the accepted data settings to the service providing system 50. In Step S57, the service use requesting unit 37 requests the inputting of the data settings to the service providing system 50 in accordance with the request from the input accepting unit 31. The service use requesting unit 37 requests the inputting of the data settings by transmitting a data input request (data entry request) including the above-described token and data pertaining to the data settings input from the user by way of, for example, the printing service screen 1100. In the process of inputting the data settings to the service providing system 50, the terminal device may input, for example, printing data of a PDL (Page Description Language) format or application data generated by using an application such as word-processing software or spreadsheet software. Further, the data input request may also include data pertaining to execution conditions (execution condition data). The data input to the service providing system 50 may include URL data for identifying Web data.

In Step S58, the session management unit 74 of the service providing system 50 determines whether a token corresponding to the token transmitted together with the data input request exists among the token(s) stored in the session management unit 74 (confirming of session). In a case where a token corresponding to the token transmitted as a data input request exists in the session management unit 74, the session management unit 74 transmits the user name and company code associated with the token to the printing service application 61 in Step S59.

In Step S60, the printing service application 61 requests obtaining of user management data corresponding to the received user name and the company code to the authentication process unit 71. In Step S61, the authentication process unit 71 obtains the user management data corresponding to the user name and the company code from the user management data storage unit 82 and transmits the obtained user management data to the printing service application 61.

In Step S62, the printing service application 61 determines the content(s) of a data conversion process to be performed by using a data format (extension) of the data included in the data input request and the user management data corresponding to the user name and the company code. The content of the data conversion process may include, for example, a data format used prior to performing data conversion, a data format used after performing data conversion, an output condition when performing the data conversion process.

In Step S63, the printing service application 61 designates a job ID of the received data included in the data input request and the determined content of the data conversion process, and requests the data process unit 75 to perform a data process on the received data based on the designated job ID and the determined content of the data conversion process. In Step S64, the printing service application 61 assigns (adds) an output data ID to the received data, and stores the received data in the other-data storage unit 85. Further, the printing service application 61 records the below-described output data management data having the output data ID assigned thereto) in the other-data storage unit 85.

In Step S65, the data process unit 75 obtains data corresponding to the job ID designated by the printing service application 61 in accordance with the data process requested by the printing service application 61. In Step S66, the data process unit 75 executes a data conversion process on the obtained data. In Step S67, the data process unit 75 stores the data subjected to the data conversion process in the other-data storage unit 85.

FIG. 18 is a schematic diagram illustrating an example of data-management data stored in the data-management data storage unit 84. The data-management data includes data items such as "job ID", "URL of input data", one or more "URL of converted data", and "conversion status". The "job ID" is data that identifies input data (e.g., input printing job). The "URL of input data" is data that indicates a location in which the input data is stored (recorded). The "URL of converted data" is data that indicates a location in which data subjected to the data conversion process (e.g., location of data subjected to the data conversion process one or more times) is stored (recorded). The "conversion status" is data that indicates a status of a data conversion process (e.g., status data indicating that the data conversion process is completed, status data indicating that the data conversion process is being performed).

Further, FIGS. 19A and 19B are schematic diagrams illustrating examples of output data-management data managed by the printing service application 61. The output data-management data of FIGS. 19A and 19B includes data items such as "output data ID", "company code", "user identification data", "bibliographic data", "job ID", and "conversion status". The "output data ID" is data that identifies input data (e.g., input printing job). The printing service application 61 can determine the status of the data conversion process performed on the input data (e.g., input printing job) based on the output data-management data.

FIG. 20 is a sequence diagram illustrating an example of an operation performed in a case of obtaining a data list from the service providing system 50 or deleting data in the service providing system 50. Because the processes performed in Steps S71 to S74 are substantially the same as those of Steps S51 to S54, description of the processes performed in Steps S71 to S74 is omitted.

The processes in Steps S75 to S84 are performed in a case of obtaining a data list from the service providing system 50 when authentication is a success (authentication result success). In Step S75, the input accepting unit 31 of the terminal device accepts a request for obtaining a data list by way of, for example, the printing service screen 1110 of FIG. 16.

In Step S76, the input accepting unit 31 requests the service user requesting unit 37 to request obtaining of the data list to the service providing system 50. In Step S77, the service use requesting unit 37 requests the obtaining of the data list to the service providing system 50 in accordance with the request from the input accepting unit 31. The service use requesting unit 37 requests the obtaining of the data list by transmitting a data list obtaining request including the above-described token and data requesting the obtaining of the data list.

Similar to Step S58, the session management unit 74 of the service providing system 50 determines whether a token corresponding to the token transmitted together with the data list obtaining request exists among the token(s) stored in the session management unit 74 in Step S78 (confirming of session). In a case where a token corresponding to the token transmitted as a data list obtaining request exists in the session management unit 74, the session management unit 74 transmits the user name and company code associated with the token to the printing service application 61 in Step S78.

In Step S79, the printing service application 61 determines a data conversion status of the output data-management data corresponding to the received user name and company code by referring to the output data-management data illustrated in FIG. 19A or 19B. In a case where the status of the output data-management data corresponding to the received user name and the company code is "processing", there may be a change in the data status of the output data-management data corresponding to the received user name and the company code. Therefore, the printing service application 61 decides (determines) to execute updating of the conversion status of the output data-management data.

This example is described assuming that the printing service application 61 decides to execute updating of the conversion status. In Step S80, when the updating of the conversion status is decided, the printing service application 61 transmits a job ID of the output data-management data corresponding to the received user name and the company code to the data process unit 75 to request obtaining of a conversion status of the data-management data corresponding to the job ID. In Step S81, the data process unit 75 refers to the data-management data of FIG. 18 and obtains the conversion status of the data-management data corresponding to the job ID received from the printing service application 61.

In Step S82, the data process unit 75 transmits the obtained conversion status of the data-management data corresponding to the job ID to the printing service application 61. In Step S83, the printing service application 61 updates the output data-management data based on the conversion status of the data-management data corresponding to the job ID received from the data process unit 75.

Then, in Step S84, the printing service application 61 transmits a data list based on the updated output data-management data to the service use requesting unit 37 of the terminal device. For example, the printing service application 61 can include a printing job(s) having a data status "completed" in the data list transmitted to the service use requesting unit 37.

On the other hand, in a case where the printing service application 61 decides not to execute updating of the conversion status in Step S79, the printing service application 61 does not update the output data-management data. Then, in Step S84, the printing service application 61 transmits the data list based on the output data-management data to the service use requesting unit 37 of the terminal. device.

Accordingly, as illustrated in FIG. 16, the terminal device can display a data list including data with a "completed" conversion status based on the conversion status changed by the data process unit 75.

Further, the processes in Steps S91 to S96 are performed in a case of deleting data from the service providing system 50 when authentication is a success (authentication result success). In Step S91, the input accepting unit 31 of the terminal device accepts a request for deleting data by way of, for example, the printing service screen 1110 of FIG. 16.

In Step S92, the input accepting unit 31 requests the service user requesting unit 37 to request deletion of data to the service providing system 50. In Step S93, the service use requesting unit 37 requests the deletion of data to the service providing system 50 in accordance with the request from the input accepting unit 31. The service use requesting unit 37 requests the deletion of data by transmitting a data deletion request including the above-described token and data requesting the deletion of data.

Similar to Step S58, the session management unit 74 of the service providing system 50 determines whether a token corresponding to the token transmitted together with the data deletion request exists among the token(s) stored in the session management unit 74 in Step S94 (confirming of session). In a case where a token corresponding to the token transmitted as a data deletion request exists in the session management unit 74, the session management unit 74 transmits the user name and company code associated with the token to the printing service application 61 in Step S94.

In Step S95, the printing service application 61 transmits the received user name and company code to the data process unit 75 and requests deletion of data. In Step S96, the data process unit 75 executes a data deletion process based on the data deletion request from the printing service application 61.

Figure 21:
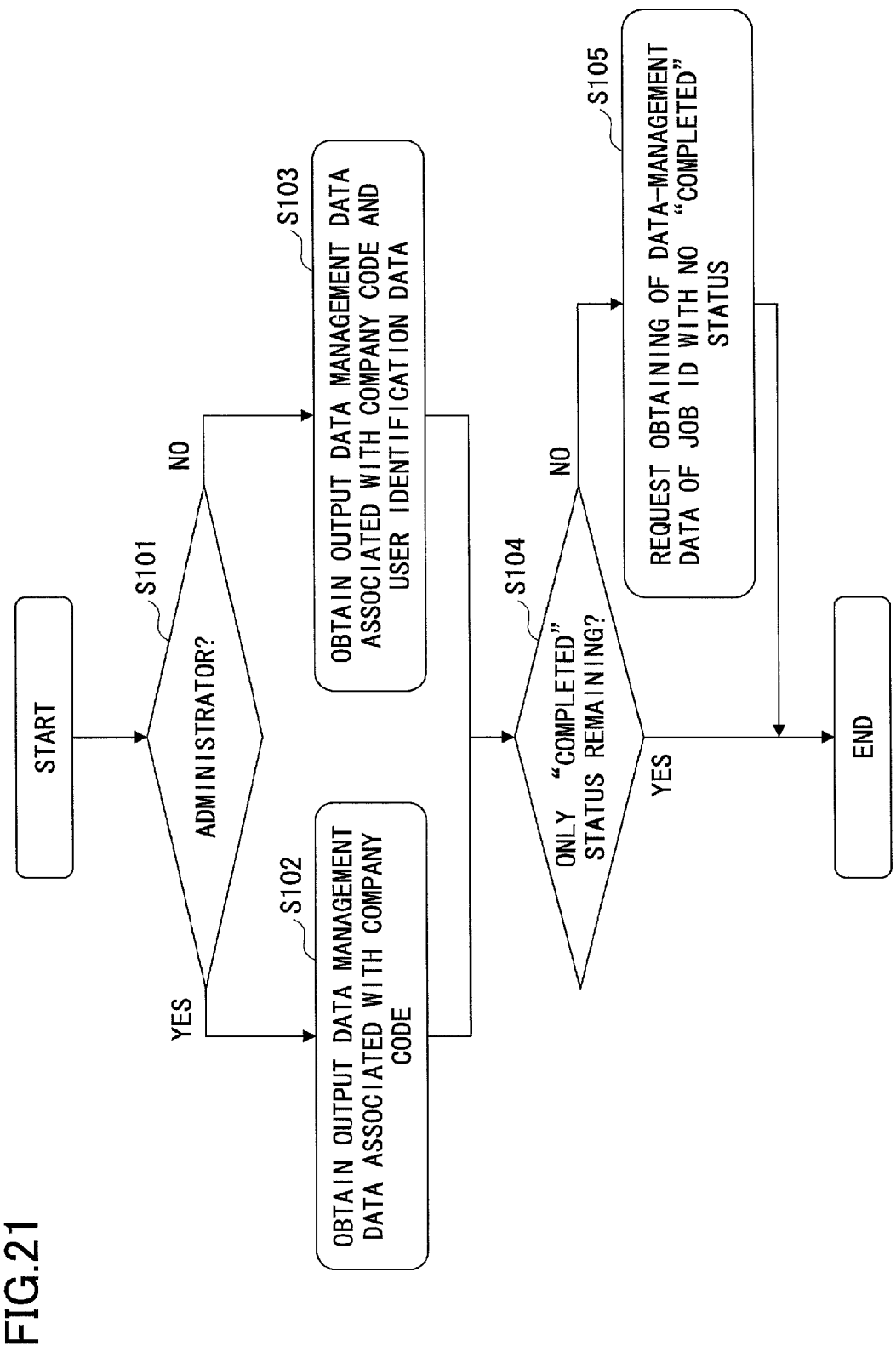
FIG. 21 is a flowchart illustrating an example of a status determination process according to an embodiment of the present invention.

Returning to Step S79, the process performed in Step S79 of FIG. 20 may be performed according to the below-described operation illustrated in the flowchart of FIG. 21. In Step S101, the printing service application 61 refers to the user management data of FIG. 8A or FIG. 8B and determines whether the role of the logged-in user that has requested the obtaining of the data list is an administrator based on the user management data corresponding to the received user name and company code.

In a case where the role of the logged-in user is an administrator (Yes in Step S101), the printing service application 61 refers to the output data-management data of FIG. 19A or FIG. 19B and confirms the conversion status of the output data-management data corresponding to the received company code in Step S102. On the other hand, in a case where the role of the logged-in user is a user (No in Step S101), the printing service application 61 refers to the output data-management data of FIG. 19A or 19B and confirms the conversion status of the output data-management data corresponding to the received company code and user name (user identification data) in Step S103.

Then, in Step S104, the printing service application 61 determines whether the conversion statuses of the output data-management data confirmed in Step S102 or Step S103 are all "completed" (i.e. data status "completed" only). In a case where the all of the conversion statuses of the output data-management data confirmed in Step S102 or Step S103 are "completed", the printing service application 61 terminates the operation of the flowchart of FIG. 21 because there is no possibility of any change of conversion status.

On the other hand, in a case where the conversion statuses of the output data-management data confirmed in Step S102 or Step S103 are not all "completed", the printing service application 61 performs a process of Step S105 because there is a possibility of a change of conversion status. In Step S105, the printing service application 61 requests to obtain a conversion status of a data-management data corresponding to a job ID that does not have a conversion status "completed".

<Data List Obtaining Process>

Figure 22:
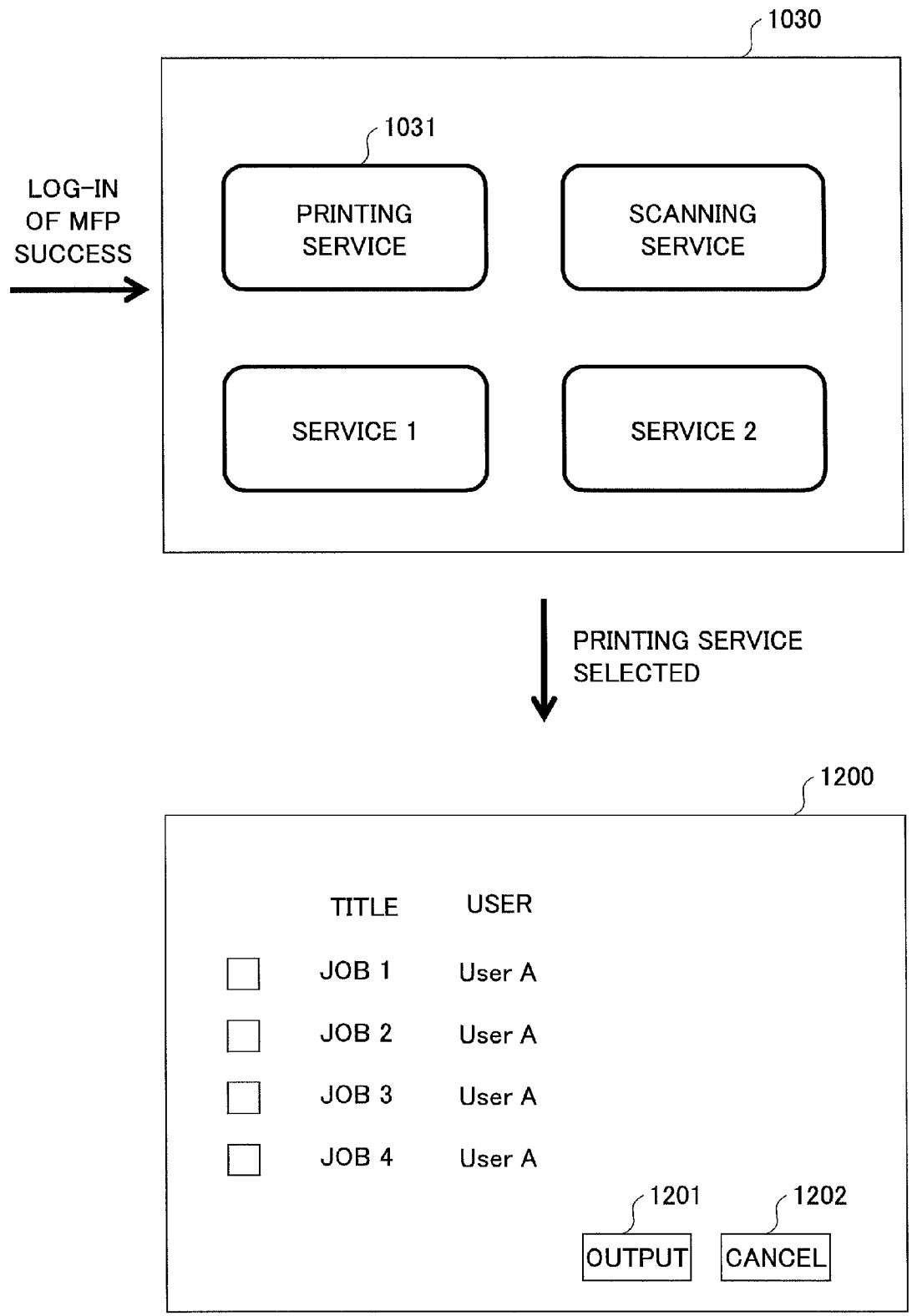
FIG. 22 is a schematic diagram illustrating an example of a transition of screens in a case where an image forming apparatus obtains a data list.

In a case where the image forming apparatus (e.g., multi-function peripheral (MFP)) 14 obtains a data list, the screen of the image forming apparatus 14 changes to the screens illustrated in FIG. 22. FIG. 22 is a schematic diagram illustrating an example of a transition of screens in a case where the image forming apparatus 14 obtains a data list.

For example, the image forming apparatus 14 displays the service list selection screen 1030 to allow the user to select a service provided by the service providing system 50. For example, the service use application of the image forming apparatus 14 displays a printing service screen 1200 when a button "printing service" 1031 in the service list selection screen 1030 is pressed.

The printing service screen 1200 is an example of a screen that displays a data list of data (e.g., printing jobs) transmitted to the service providing system 50. The user can perform output or deletion of data (e.g., printing job) with the data list displayed in the printing service screen 1200 by pressing an output button 1201 or a deletion button 1202 in the printing service screen 1200.

Figure 23:
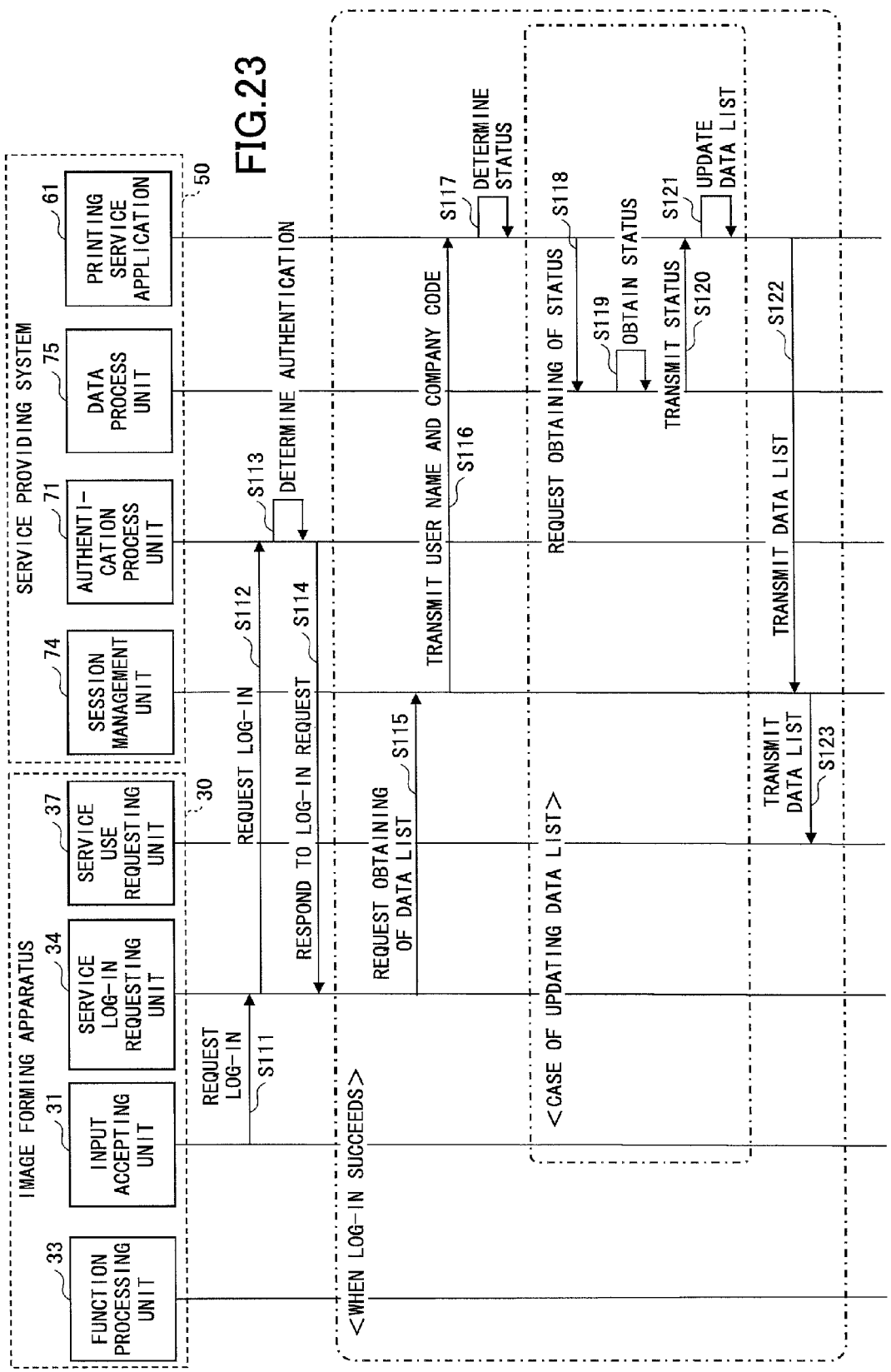
FIG. 23 is a sequence diagram illustrating an example of an operation performed in a case of obtaining a data list from a service providing system with an image forming apparatus.

FIG. 23 is a sequence diagram illustrating an example of an operation performed in a case of obtaining a data list from the service providing system 50 with the image forming apparatus 14. Because the processes performed in Steps S111 to S114 are substantially the same as those of Steps S51 to S54, description of the processes performed in Steps S111 to S114 is omitted.

The process in Step S115 and the processes after Step S115 are performed when authentication is a success (authentication result success). In Step S115, the service log-in requesting unit 34 requests to obtain a data list to the service providing system 50 by transmitting a data list obtaining request including the above-described token and data requesting the obtaining of the data list.

Similar to Step S58, the session management unit 74 of the service providing system 50 determines whether a token corresponding to the token transmitted together with the data list obtaining request exists among the token(s) stored in the session management unit 74 in Step S116 (confirming of session). In a case where a token corresponding to the token transmitted as a data list obtaining request exists in the session management unit 74, the session management unit 74 transmits the user name and company code associated with the token to the printing service application 61 in Step S116.

Similar to Step S79 of FIG. 20, the printing service application 61 performs determination of conversion status in Step S117. In a case where the status of the output data-management data corresponding to the received user name and the company code is "processing", the printing service application 61 transmits a job ID of the output data-management data corresponding to the received user name and the company code to the data process unit 75 to request obtaining of a conversion status of the data-management data corresponding to the job ID in Step S118. In Step S119, the data process unit 75 refers to the data-management data of FIG. 18 and obtains the conversion status of the data-management data corresponding to the job ID received from the printing service application 61.

In Step S120, the data process unit 75 transmits the obtained conversion status of the data-management data corresponding to the job ID to the printing service application 61. In Step S121, the printing service application 61 updates the output data-management data based on the conversion status of the data-management data corresponding to the job ID received from the data process unit 75.

Then, in Steps S121 and S122, the printing service application 61 transmits a data list based on the updated output data-management data to the service use requesting unit 37 of the image forming apparatus 14 via the session management unit 74. On the other hand, in a case where the printing service application 61 decides (determines) not to execute updating of the conversion status in Step S117, the printing service application 61 does not update the output data-management data. Then, in Steps S122 and S123, the printing service application 61 transmits the data list based on the output data-management data to the service use requesting unit 37 of the image forming apparatus 14.

Accordingly, as illustrated in FIG. 22, the image forming apparatus 14 can display a data list including data with a "completed" conversion status based on the conversion status changed by the data process unit 75.

<Data Output Process/Data Deletion Process>

Figure 24:
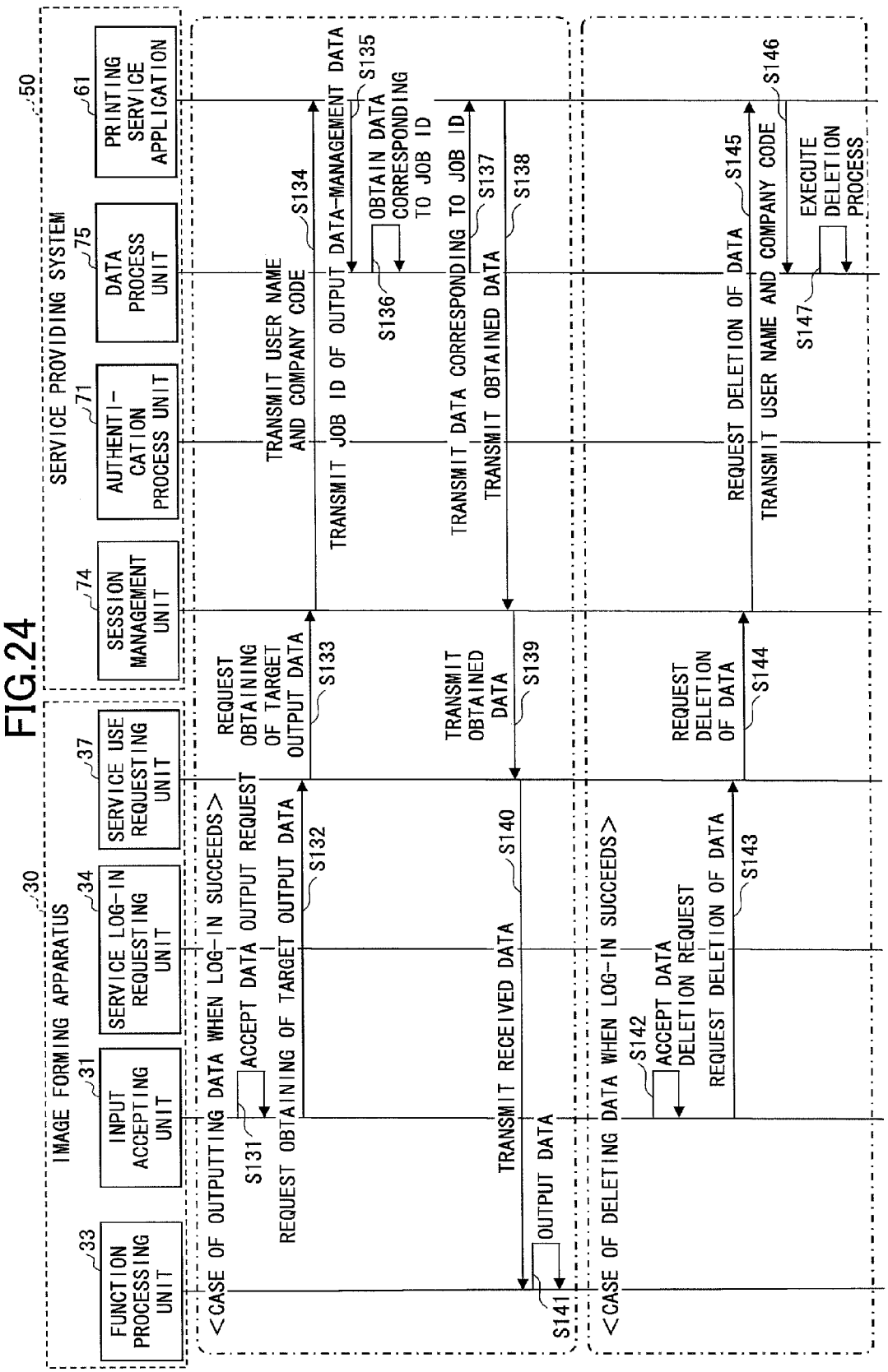
FIG. 24 is a sequence diagram illustrating an example of an operation performed in a case of outputting data from an image forming apparatus or deleting data in a service providing system.

FIG. 24 is a sequence diagram illustrating an example of an operation performed in a case of outputting data from the image forming apparatus 14 or deleting data in the service providing system 50. The operation illustrated in the sequence diagram of FIG. 24 may be performed, for example, after performing the operation illustrated in the sequence diagram of FIG. 23.

The processes in Steps S131 to S141 are performed in a case of outputting data from the image forming apparatus 14 when authentication is a success (authentication result success). In Step S131, the input accepting unit 31 of the image forming apparatus 14 accepts a request for outputting data (data to be output, hereinafter also referred to as "target output data") by way of, for example, the printing service screen 1200 of FIG. 22.

In Step S132, the input accepting unit 31 requests the service user requesting unit 37 to request obtaining of the target output data to the service providing system 50. In Step S133, the service use requesting unit 37 requests the obtaining of the target output data to the service providing system 50 in accordance with the request from the input accepting unit 31. The service use requesting unit 37 requests the obtaining of the target output data by transmitting a data obtaining request including the above-described token and data requesting the obtaining of the target output data.

Similar to Step S58, the session management unit 74 of the service providing system 50 determines whether a token corresponding to the token transmitted together with the data obtaining request exists among the token(s) stored in the session management unit 74 in Step S134 (confirming of session). In a case where a token corresponding to the token transmitted as a data obtaining request exists in the session management unit 74, the session management unit 74 transmits the user name and company code associated with the token to the printing service application 61 in Step S134.

In Step S135, the printing service application 61 transmits a job ID of the output data-management data corresponding to the received user name and the company code to the data process unit 75 to request obtaining of data corresponding to the job ID. In Step S136, the data process unit 75 refers to the data-management data of FIG. 18 and obtains the data corresponding to the job ID received from the printing service application 61. In Step S137, the data process unit 75 transmits the obtained data corresponding to the received job ID to the printing service application 61.

Before transmitting the data received from the data process unit 71, the printing service application 61 rewrites the user name of the side of the public network N2 (Kobayashi) in the data received from the data process unit 71 with the user name of the side of the private network N1 (Koba).

In Steps S138 and S139, the printing service application 61 transmits the received data to the service use requesting unit 37 of the image forming apparatus 14 via the session management unit 74. In Step S140, the service use requesting unit 37 transmits the received data to, for example, the function processing unit 33 (e.g., output unit). Then, in Step S141, the function processing unit 33 outputs the data (target output data) received from the service use requesting unit 37. In Step S141, the image forming apparatus 14 can output the target output data in which the user name of the target output data is the user name of the side of the private network N1 (Koba).

Further, the processes in Steps S142 to S147 are performed in a case of deleting data from the service providing system 50 when authentication is a success (authentication result success). In Step S142, the input accepting unit 31 of the image forming apparatus 14 accepts a request for deleting data by way of, for example, the printing service screen 1200 of FIG. 22.

In Step S143, the input accepting unit 31 requests the service user requesting unit 37 to request deletion of data to the service providing system 50. In Step S144, the service use requesting unit 37 requests the deletion of data to the service providing system 50 in accordance with the request from the input accepting unit 31. The service use requesting unit 37 requests the deletion of data by transmitting a data deletion request including the above-described token and data requesting the deletion of data.

Similar to Step S58, the session management unit 74 of the service providing system 50 determines whether a token corresponding to the token transmitted together with the data deletion request exists among the token(s) stored in the session management unit 74 in Step S145 (confirming of session). In a case where a token corresponding to the token transmitted as a data deletion request exists in the session management unit 74, the session management unit 74 transmits the user name and company code associated with the token to the printing service application 61 in Step S145.

In Step S146, the printing service application 61 transmits the received user name and company code to the data process unit 75 and requests deletion of data. In Step S147, the data process unit 75 executes a data deletion process based on the data deletion request from the printing service application 61.

<Summation of First Embodiment>

With the system 1 according to the first embodiment of the present invention, a mechanism associating user identification data (user name) authenticated on the side of the private network N1 with a user name of the side of the public network N2 can be provided. With the mechanism, seamless coordination between authentication on the side of the private network N1 and authentication on the side of the public network N2 can be achieved while maintaining information security.

(Second Embodiment)

In the first embodiment of the present invention, the association between the user name authenticated on the side of the private network N1 and the user name of the public network N2 is recorded in the service providing system 50. In the second embodiment of the present invention, the association between the user name authenticated on the side of the private network N1 and the user name of the public network N2 is recorded in the authentication apparatus 17 on the side of the private network N1. In the second embodiment, like components/units are denoted with like reference numerals as the components/units of the first embodiment and are not further explained. The system configuration and the hardware configuration of the second embodiment are substantially the same as the system configuration and the hardware configuration of the first embodiment.

<Software Configuration>

In terms of software configuration, the authentication apparatus 17 and the service providing system 50 of the first embodiment are different from the below-described authentication apparatus 17 and service providing system 50 of the second embodiment.

Figure 25:
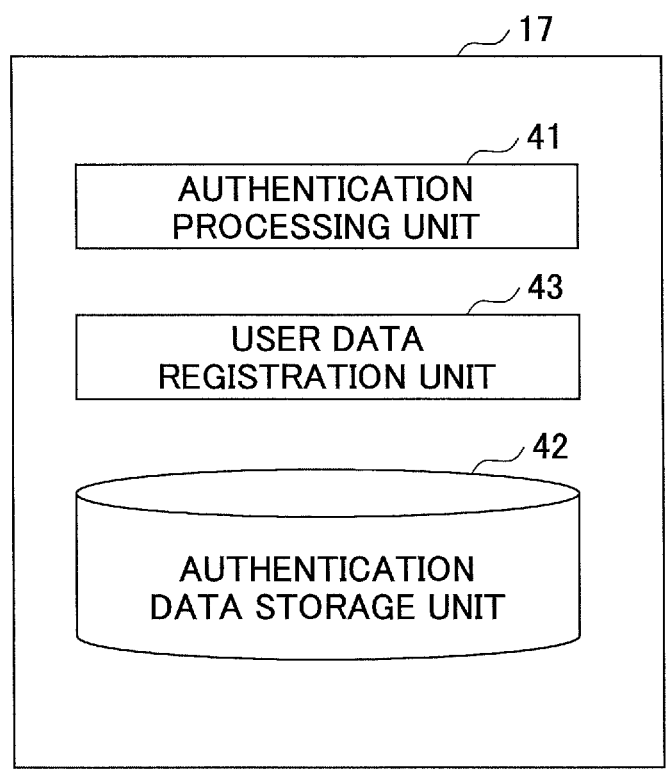
FIG. 25 is a block diagram illustrating an example of a configuration of an authentication apparatus according to an embodiment of the present invention.

The authentication apparatus 17 of the second embodiment may be implemented with, for example, a configuration illustrated in a block diagram of FIG. 25. FIG. 25 is a block diagram illustrating an example of a configuration of the authentication apparatus 17 of the second embodiment.

The authentication apparatus 17 of FIG. 25 executes a program(s) to implement the below-described functions/processes of the authentication process unit 41, the authentication data storage unit 42, and a user data registration unit 43. The authentication apparatus 17 of FIG. 25 has a configuration in which the user data registration unit 43 is added to the configuration of the authentication apparatus 17 illustrated in FIG. 4. The user data registration unit 43 is substantially equivalent to the user data registration unit 73 included in the service providing system 50 of the first embodiment. The user data registration unit 43 receives a request to register a portion of authenticated authentication data or an entire authenticated authentication data from a terminal device (e.g., client terminal 11) and registers the portion of the authenticated authentication data or the entire authenticated authentication data as described below.

Accordingly, the registration requesting unit 35 of the office device 30 of the second embodiment requests the portion of the authenticated authentication data (e.g., user name) or the entire authenticated authentication data to be registered to the authentication apparatus 17 instead of the service providing system 50 of the second embodiment.

The service providing system 50 of the second embodiment may be implemented with, for example, a configuration illustrated in a block diagram of FIG. 26. FIG. 26 is a block diagram illustrating an example of a configuration of the service providing system 50 of the second embodiment. The service providing system 50 of FIG. 26 has a configuration in which the user data registration unit 73 is omitted from the configuration of the service providing system 50 of FIG. 6.

The authentication data storage unit 42 of the authentication apparatus 17 stores, for example, authentication data as illustrated in FIGS. 27A and 27B. FIGS. 27A and 27B are schematic diagram illustrating examples of authentication data stored in the authentication data storage unit 42 of the second embodiment. The authentication data of FIGS. 27A and 27B have configurations in which a data item "service user name" and a data item "service password" are added to the configurations illustrated in FIGS. 5A and 5B. The data item "service user name" and the data item "service password" correspond to authentication data of the side of the public network N2.

With the authentication data illustrated in FIGS. 27A and 27B, the system 1 of the second embodiment can coordinate authentication of the side of the private network N1 and authentication of the side of the public network N2 while maintaining information security.

The user management data of the second embodiment may have a configuration illustrated in FIG. 28. FIG. 28 is a schematic diagram illustrating an example of a configuration of the user management data stored in the user management data storage unit 82 according to the second embodiment of the present invention. The user management data of FIG. 28 has a configuration in which office authentication data is omitted from the configuration of the user management data of FIG. 8.

<Details of Processes of System>

In terms of the processes performed with the system 1 of the second embodiment, the log-in process of the second embodiment is different from the log-in process of the first embodiment.

Figure 29A:
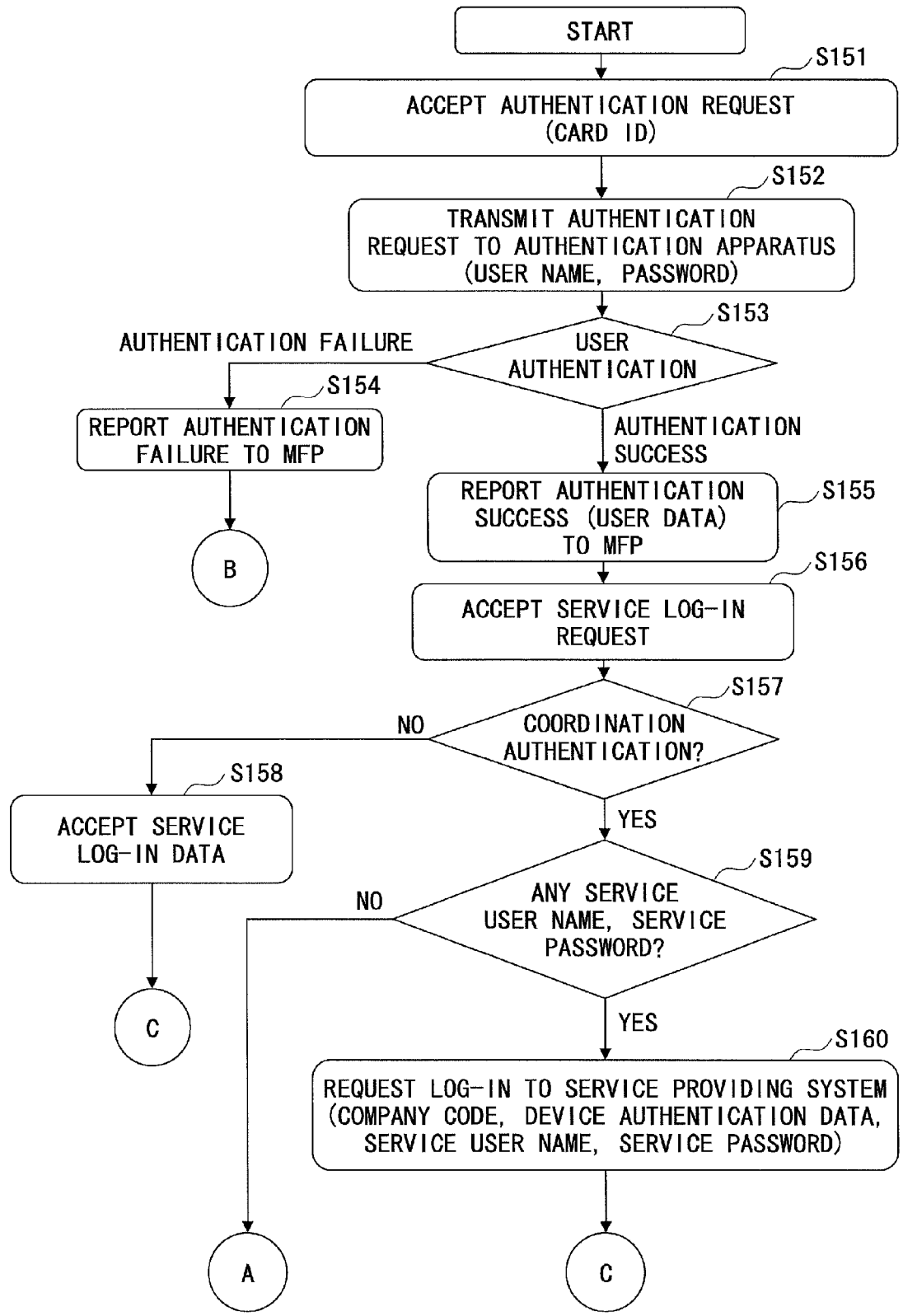
FIGS. 29A and 29B are flowcharts illustrating examples of a log-in process performed with a system according to an embodiment of the present invention.
Figure 29B:
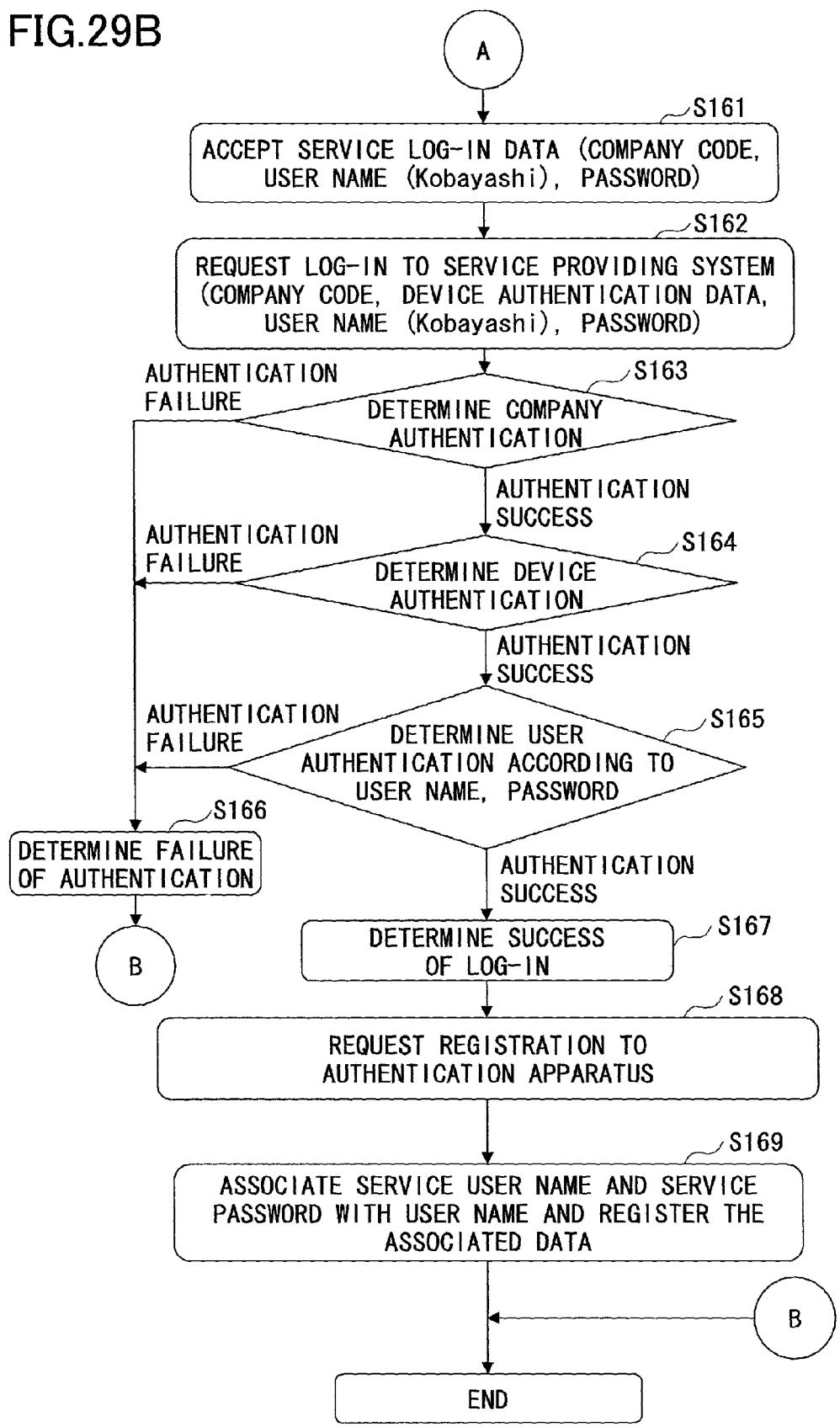

FIG. 29 is a flowchart illustrating an example of a log-in process performed with the system 1 of the second embodiment. Because some parts of the flowchart of FIG. 29 are the same as the flowchart of FIG. 15, detailed description of the same parts are omitted.

In Step S151, the image forming apparatus 14 accepts an authentication request by receiving input of authentication data (e.g., card ID of an IC card) from the user. In Step S152, the authentication requesting unit 32 of the image forming apparatus 14 transmits the authentication data to the authentication apparatus 17 to request authentication.

In Step S153, the authentication process unit 41 of the authentication apparatus 17 performs user authentication by determining whether the "user name" and "password" included in the authentication data transmitted from the image forming apparatus 14 exist in the authentication data illustrated in FIG. 27. In a case where the user name and the password exist in the authentication data illustrated in FIG. 27, the authentication process unit 41 determines that the user authentication determination is a success (authentication success) and proceeds to a process of Step S155.

In Step S155, the authentication process unit 41 reads out the authentication data transmitted from the image forming apparatus 14 (including "user name" and "password" (user data)) from the authentication data storage unit 42, transmits the authentication data to the authentication requesting unit 32 of the image forming apparatus 14, and reports the success of the user authentication to the image forming apparatus 14.

On the other hand, in a case where the user name and the password do not exist in the authentication data illustrated in FIG. 27, the authentication process unit 41 determines that the user authentication determination is a failure (authentication failure) and proceeds to a process of Step S154. In Step S154, the authentication processing unit 41 reports the failure of the user authentication to the authentication requesting unit 32 of the image forming apparatus 14. Accordingly, the operation of the flowchart of FIG. 29 is terminated.

In Step S156, the image forming apparatus 14 that has received the report of the success of the user authentication accepts a log-in request from the user for logging-in to the service providing system 50. In Step S157, the service log-in requesting unit 34 of the image forming apparatus 14 determines whether the log-in setting "coordination with in-house authentication" is selected.

In a case where "coordination with in-house authentication" is not selected (No in Step S157), the image forming apparatus 14 (by way of the service log-in requesting unit 34) displays the log-in screen 1020 (see FIG. 11) in Step S158 to allow the user to input a company code, a user name of the side of the public network N2, and a password. After the process of Step S158, the image forming apparatus 14 logs in to the service providing system 50 when the processes of the flowchart of FIG. 14 are a success (authentication success).

In a case where "coordination with in-house authentication" is selected (Yes in Step S157), the service log-in requesting unit 34 proceeds to a process of Step S159. In Step S159, the service log-in requesting unit 34 determines whether a service user name and a service password exist in the user data (authentication data) received in Step S155.

In a case where the service user name and the service password exist in the user data (Yes in Step S159), the service log-in requesting unit 34 transmits a log-in request including authentication data including (in this example, a company name, device authentication data, service user name, and a service password) to the service providing system 50 in Step S160. After the process of Step S160, the image forming apparatus 14 logs in to the service providing system 50 when the processes of the flowchart of FIG. 14 are a success (authentication success).

In a case where the service user name and the service password do not exist in the user data (No in Step S159), the image forming apparatus 14 (by way of the service log-in requesting unit 34) displays the log-in screen 1020 (see FIG. 11) in Step S161 to allow the user to input authentication data of the side of the public network N2 including, for example, a company code, a user name of the side of the public network N2 (Kobayashi), and a password.

In Step S162, the service log-in requesting unit 34 of the image forming apparatus 14 transmits authentication data (in this example, company code, device authentication data, user name (Kobayashi), password) to the service providing system 50 to request log-in to the service providing system 50.

In Step S163, the authentication process unit 71 of the service providing system 50 performs the company authentication determination (see, for example, Step S12 of FIG. 14). The authentication process unit 71 proceeds to a process of Step S164 when the company authentication determination is a success (authentication success).

In Step S164, the authentication process unit 71 performs the device authentication determination (see, for example, Step S13 of FIG. 14). The authentication process unit 71 proceeds to a process of Step S165 when the device authentication determination is a success (authentication success).

In Step S165, the authentication process unit 71 performs the user authentication determination (see, for example, Step S14 of FIG. 14). The authentication process unit 71 proceeds to a process of Step S167 when the user authentication determination is a success (authentication success).

In Step S167, the authentication process unit 71 determines that the authentication in response to the log-in request from the image forming apparatus 14 is a success (authentication success). In Step 168, the registration requesting unit 35 of the image forming apparatus 14 sends a registration request to the authentication apparatus 17. The registration request is for requesting the authentication apparatus 17 to register the service user name (Kobayashi) and the service password that have been authenticated on the side of the public network N2. The registration request of Step S168 includes a user name of the side of the private network N1 (Kobayashi), a service user name, and a service password.

In Step S169, the user data registration unit 43 of the authentication apparatus 17 associates the service user name and the service password with the user name authenticated on the side of the private network N1 (user identification data) and registers the service user name and the service password as authentication data in the authentication apparatus 17.

On the other hand, in a case where the authentication process unit 71 determines that the company authentication determination of Step S163, the device authentication determination of Step S164, or the user authentication determination of Step S165 is a failure (authentication failure), the authentication process unit 71 determines that authentication in response to the registration request from the image forming apparatus 14 is a failure in Step S166.

As illustrated in the flowchart of FIG. 29, in a case where the user name authenticated on the side of the private network N1 (Koba) and the user name of the side of the public network N2 (Kobayashi) are associated to each other in the authentication data, the user can log in to the service providing system 50 without having to input the authentication data of the side of the public network N2 to the log-in screen 1020.

Further, even in a case where the user name authenticated on the side of the private network N1 (Koba) and the user name of the side of the public network N2 (Kobayashi) are not associated to each other in the authentication data, authentication data that associates the user name authenticated on the side of the private network N1 (Koba) and the user name of the side of the public network N2 (Kobayashi) can be easily registered.

<Summation of Second Embodiment>

With the system 1 according to the second embodiment of the present invention, an association between user identification data (user name) authenticated on the side of the private network N1 and a user name of the side of the public network N2 can be registered on the side of the private network N1.

(Third Embodiment)

In the third embodiment, no authentication apparatus 17 is provided on the side of the private network N1. Further, in the third embodiment, authentication is performed with the below-described office device 30 (see FIGS. 31A and 31B). In the third embodiment, like components/units are denoted with like reference numerals as the components/units of the first embodiment and are not further explained.

Figure 30:
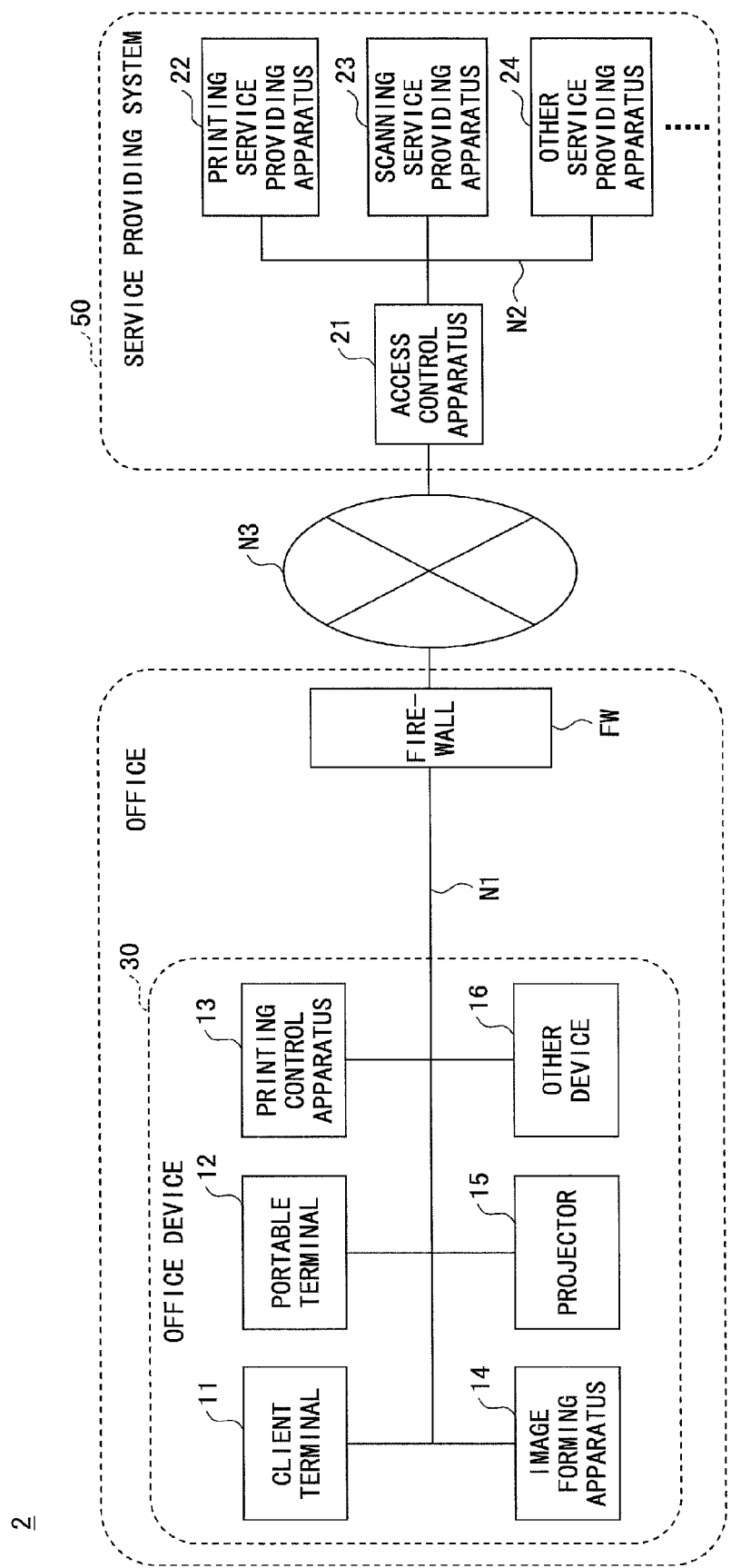
FIG. 30 is a schematic diagram illustrating an example of a system according to an embodiment of the present invention.

FIG. 30 is a schematic diagram illustrating an example of a system (e.g., network system) 2 according to an embodiment of the present invention. The system 2 of FIG. 2 has a configuration in which the authentication apparatus 17 is omitted from the system 1 of FIG. 1. In the system 2 of FIG. 2, the office device 30 has a software configuration as illustrated in FIG. 31A or FIG. 31B.

Figure 31A:
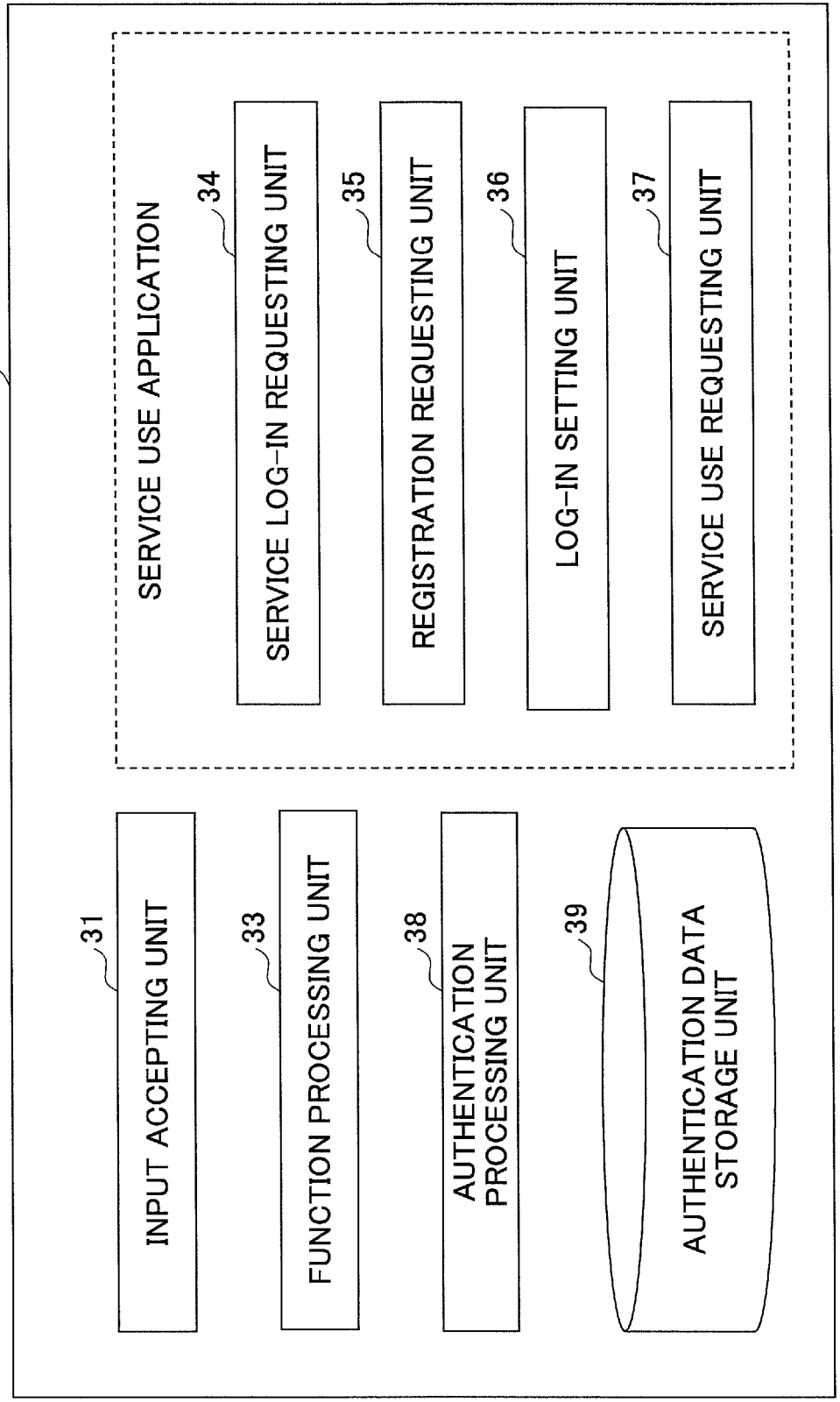

FIGS. 31A and 31B are block diagrams illustrating examples of the office device 30 according to the third embodiment. FIG. 31A illustrates an example of the office device 30 in a case where the authentication apparatus 17 is omitted from the system 1 of the first embodiment. FIG. 31B illustrates an example of the office device 30 in a case where the authentication apparatus 17 is omitted from the system 1 of the second embodiment.

The office device 30 of FIG. 31A has a configuration in which an authentication processing unit 38 and an authentication data storage unit 39 are added to the configuration of the office device 30 of FIG. 3, and the authentication requesting unit 32 is omitted from the configuration of the office device 30 of FIG. 3. The authentication processing unit 38 and the authentication data storage unit 39 correspond to the above-described authentication processing unit 41 and the authentication data storage unit 42 of the authentication apparatus 17.

The office device 30 of FIG. 31B has a configuration in which the authentication process unit 38, the authentication data storage unit 39, and the user data registration unit 40 are added to the configuration of the office device 30 of FIG. 3, and the authentication requesting unit 32 is omitted from the configuration of the office device 30. The user data registration unit 40 corresponds to the user data registration unit 43 of the authentication apparatus 17.

<Summation of Third Embodiment>

With the system (e.g., printing system) 2 according to the third embodiment of the present invention, a mechanism associating user identification data (user name) authenticated on the side of the private network N1 with a user name of the side of the public network N2 can be provided without having the authentication apparatus 17.

The present invention is not limited to the specifically disclosed embodiments, and variations and modifications may be made without departing from the scope of the present invention.

The present application is based on and claims benefit of priority of Japanese Priority Application No. 2012-196064 filed on Sep. 6, 2012, the entire contents of which are hereby incorporated by reference.

What is claimed is:

1. A network system, comprising:
a terminal;
a system connected to the terminal via a network, the system including one or more data processing apparatuses and configured to execute a process according to a request transmitted from the terminal via the network;
a first storage unit, at the terminal or an authentication apparatus connected to the terminal, that stores first authentication data used for a first user authentication;
a first authentication unit, at the terminal or the authentication apparatus, that performs a first user authentication with respect to a user at the terminal;
a second storage unit, at the system, that stores user management data that includes specification data in association with second authentication data used for a second user authentication, the specification data identifying a user authenticated by the first authentication data, the first authentication data unit not authenticating the user by only the specification data; and
a second authentication unit, at the system, that performs the second user authentication with respect to the user at the terminal to use the system based on the specification data when the terminal sends the specification data of the authenticated user by the first user authentication and based on the second authentication data when the terminal sends the second authentication data input by the user.

2. The network system as claimed in claim 1,
wherein in a case where the specification data received from the terminal is stored in the second storage unit, the second authentication unit is configured to perform the second user authentication.

3. The network system as claimed in claim 2,
further comprising:
a receiving unit configured to receive the second authentication data from the terminal in a case where the specification data received by the second authentication unit is not stored in the second storage unit;
a third authentication unit configured to perform a third user authentication on the second authentication data received from the terminal; and
a registration unit configured to register at least a portion of the second authentication data received from the terminal in association with the specification data.

4. The network system as claimed in claim 1,
wherein the second authentication unit is configured to receive a portion of the second authentication data associated with the specification data from the terminal and perform the second user authentication.

5. A data processing apparatus, comprising:
a connection unit configured to connect with a terminal, that is stored with first user authentication data used for a first user authentication by a first authentication unit at the terminal, via a network;
a storage unit configured to store user management data that includes specification data in association with second authentication data used for a second user authentication, the specification data identifying a user authenticated by the first user authentication, the first authentication unit not authenticating the user by only the specification data;
a first receiving unit configured to receive authenticated by the first user authentication from the terminal; and
a second authentication unit that performs the second user authentication with respect to the user at the terminal to use a service based on the specification data when the terminal sends the specification data of the authenticated user by the first user authentication and based on the second authentication data when the terminal sends the second authentication data input by the user.

6. The data processing apparatus as claimed in claim 5,
wherein in a case where the specification data is stored in the storage unit, the second authentication unit performs the second user authentication.

7. The data processing apparatus as claimed in claim 6,
further comprising:
a second receiving unit configured to receive the second authentication data from the terminal in a case where the specification data received by the first receiving unit is not stored in the storage unit;
a third authentication unit configured to perform a third user authentication on the second authentication data received from the terminal; and
a registration unit configured to register at least a portion of the second authentication data received from the terminal in association with the specification data in a case where the second authentication data is authenticated by the third authentication unit.

8. The data processing apparatus as claimed in claim 7,
further comprising:
a third receiving unit configured to receive the second authentication data from an apparatus;
a fourth authentication unit configured to perform a fourth user authentication on the second authentication data received by the third receiving unit; and
a data receiving unit configured to receive data from the apparatus in a case where the second authentication data is authenticated by the fourth authentication unit;
wherein the terminal is configured to use the service by using the data received from the apparatus in a case where the second authentication unit performs the second user authentication.

9. A method for processing data with a terminal and a system connected to the terminal via a network, the method comprising the steps of:
executing a process according to a request transmitted from the terminal via the network;
performing a first user authentication with respect to a user at the terminal;
storing user management data that includes specification data in association with second authentication data used for a second user authentication in a storage unit, the specification data identifying a user authenticated by the first user authentication, the first authentication not authenticating the user by only the specification data; and performing the second user authentication with respect to the user at the terminal to use the system based on the specification data when the terminal sends the specification data of the authenticated user by the first user authentication and based on the second authentication data when the terminal sends the second authentication data input by the user.

10. The method as claimed in claim 9, wherein in a case where the specification data received from the terminal is stored in the storage unit, the second user authentication is performed.

11. The method as claimed in claim 10, further comprising:

receiving the second authentication data from the terminal in a case where the specification data is not stored in the storage unit;

performing a third user authentication on the second authentication data received from the terminal; and registering at least a portion of the second authentication data received from the terminal in association with the specification data.

12. The method as claimed in claim 10, wherein the storage unit is provided in the authentication apparatus, wherein the second user authentication is performed in a case where a portion of the second authentication data associated with the specification data from the terminal is received.

* * * * *